United States Patent
Zhang et al.

(10) Patent No.: US 11,041,103 B2
(45) Date of Patent: Jun. 22, 2021

(54) SILICONE-FREE THERMAL GEL

(71) Applicant: Honeywell International Inc., Morris Plains, NJ (US)

(72) Inventors: Liqiang Zhang, Shanghai (CN); Huifeng Duan, Shanghai (CN); Rongwei Pan, Shanghai (CN); Qi Zhang, Shanghai (CN); Ya Qun Liu, Shanghai (CN); Haigang Kang, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 173 days.

(21) Appl. No.: 16/105,456

(22) Filed: Aug. 20, 2018

(65) Prior Publication Data

US 2019/0078007 A1 Mar. 14, 2019

Related U.S. Application Data

(60) Provisional application No. 62/555,954, filed on Sep. 8, 2017.

(51) Int. Cl.
*C09K 5/14* (2006.01)
*C08L 71/02* (2006.01)

(52) U.S. Cl.
CPC ............ *C09K 5/14* (2013.01); *C08L 71/02* (2013.01); *C08L 2201/08* (2013.01); *C08L 2203/20* (2013.01); *C08L 2205/025* (2013.01); *C08L 2205/03* (2013.01); *C08L 2312/00* (2013.01)

(58) Field of Classification Search
None
See application file for complete search history.

(56) References Cited

U.S. PATENT DOCUMENTS

| | | |
|---|---|---|
| 1,655,133 A | 1/1928 | Clase |
| 2,451,600 A | 10/1948 | Woodcock |
| 2,810,203 A | 10/1957 | Bachofer |
| 3,262,997 A | 7/1966 | Cameron et al. |
| 4,006,530 A | 2/1977 | Nicolas |
| 4,087,918 A | 5/1978 | Schmid et al. |
| 4,180,498 A | 12/1979 | Spivack |
| 4,265,026 A | 5/1981 | Meyer |
| 4,446,266 A | 5/1984 | von Gentzkow et al. |
| 4,459,185 A | 7/1984 | Obata et al. |
| 4,559,709 A | 12/1985 | Beseme et al. |
| 4,565,610 A | 1/1986 | Nobel et al. |
| 4,604,424 A | 8/1986 | Cole et al. |
| 4,787,149 A | 11/1988 | Possati et al. |
| 4,816,086 A | 3/1989 | Oleske |
| 4,832,781 A | 5/1989 | Mears |
| 4,839,955 A | 6/1989 | Vannier |
| 4,910,050 A | 3/1990 | Oldham et al. |
| 5,162,555 A | 11/1992 | Remmers et al. |
| 5,167,851 A | 12/1992 | Jamison et al. |
| 5,294,923 A | 3/1994 | Juergens et al. |
| 5,391,924 A | 2/1995 | Uchida et al. |
| 5,403,580 A | 4/1995 | Bujanowski et al. |
| 5,562,814 A | 10/1996 | Kirby |
| 5,660,917 A | 8/1997 | Fujimori et al. |
| 5,816,699 A | 10/1998 | Keith et al. |
| 5,930,115 A | 7/1999 | Tracy et al. |
| 5,950,066 A | 9/1999 | Hanson et al. |
| 6,040,362 A | 3/2000 | Mine et al. |
| 6,054,198 A | 4/2000 | Bunyan et al. |
| 6,090,484 A | 7/2000 | Bergerson |
| 6,096,414 A | 8/2000 | Young |
| 6,165,612 A | 12/2000 | Misra |
| 6,197,859 B1 | 3/2001 | Hanson et al. |
| 6,238,596 B1 | 5/2001 | Nguyen et al. |
| 6,339,120 B1 | 1/2002 | Misra et al. |
| 6,372,337 B2 | 4/2002 | Takahashi et al. |
| 6,372,997 B1 | 4/2002 | Hill et al. |
| 6,391,442 B1 | 5/2002 | Duvall et al. |
| 6,400,565 B1 | 6/2002 | Shabbir et al. |
| 6,432,320 B1 | 8/2002 | Bonsignore et al. |
| 6,432,497 B2 | 8/2002 | Bunyan |
| 6,451,422 B1 | 9/2002 | Nguyen |
| 6,475,962 B1 | 11/2002 | Khatri |
| 6,496,373 B1 | 12/2002 | Chung |
| 6,500,891 B1 | 12/2002 | Kropp et al. |
| 6,506,332 B2 | 1/2003 | Pedigo |
| 6,562,180 B1 | 5/2003 | Bohin et al. |

(Continued)

FOREIGN PATENT DOCUMENTS

| | | |
|---|---|---|
| CA | 2311067 A1 | 1/2001 |
| CA | 2433637 A1 | 12/2002 |

(Continued)

OTHER PUBLICATIONS

"Phase Change Material: DAPCM80-1",MH&W International Corp., May 2012, http://mhw-thermal.com, 1 pages.
Extended European Search Report issued in EP Application 15749120.0, dated Aug. 11, 2017, 6 pages.
International Preliminary Report on Patentability received for PCT Patent Application No. PCT/US17/41447, dated Feb. 7, 2019, 8 pages.
International Search Report and Written Opinion dated in PCT/CN2014/093138, dated Sep. 6, 2015, 8 pages.
International Search Report and Written Opinion dated in PCT/CN2016/101874, dated Apr. 28, 2017, 12 pages.

(Continued)

*Primary Examiner* — Sheeba Ahmed
(74) *Attorney, Agent, or Firm* — Faegre Drinker Biddle & Reath LLP

(57) ABSTRACT

The present disclosure provides a silicone free gel that is useful in transferring heat from heat generating electronic devices, such as computer chips, to heat dissipating structures, such as heat spreaders and heat sinks. The thermal interface material includes a polyether polyol, a cross-linker, a coupling agent, an antioxidant, a catalyst, and at least one thermally conductive filler.

10 Claims, 9 Drawing Sheets

(56) References Cited

U.S. PATENT DOCUMENTS

| | | |
|---|---|---|
| 6,597,575 B1 | 7/2003 | Matayabas et al. |
| 6,605,238 B2 | 8/2003 | Nguyen et al. |
| 6,610,635 B2 | 8/2003 | Khatri |
| 6,616,999 B1 | 9/2003 | Freuler et al. |
| 6,617,517 B2 | 9/2003 | Hill et al. |
| 6,620,515 B2 | 9/2003 | Feng et al. |
| 6,624,224 B1 | 9/2003 | Misra |
| 6,645,643 B2 | 11/2003 | Zafarana et al. |
| 6,649,325 B1 | 11/2003 | Gundale et al. |
| 6,657,297 B1 | 12/2003 | Jewram et al. |
| 6,673,434 B2 | 1/2004 | Nguyen |
| 6,706,219 B2 | 3/2004 | Nguyen |
| 6,761,928 B2 | 7/2004 | Hill et al. |
| 6,764,759 B2 | 7/2004 | Duvall et al. |
| 6,783,692 B2 | 8/2004 | Bhagwagar |
| 6,791,839 B2 | 9/2004 | Bhagwagar |
| 6,797,382 B2 | 9/2004 | Nguyen et al. |
| 6,797,758 B2 | 9/2004 | Misra et al. |
| 6,811,725 B2 | 11/2004 | Nguyen et al. |
| 6,815,486 B2 | 11/2004 | Bhagwagar et al. |
| 6,835,453 B2 | 12/2004 | Greenwood et al. |
| 6,838,182 B2 | 1/2005 | Kropp et al. |
| 6,841,757 B2 | 1/2005 | Marega et al. |
| 6,874,573 B2 | 4/2005 | Collins et al. |
| 6,900,163 B2 | 5/2005 | Khatri |
| 6,901,675 B2 | 6/2005 | Edwards et al. |
| 6,908,669 B2 | 6/2005 | Nguyen |
| 6,908,682 B2 | 6/2005 | Mistele |
| 6,913,686 B2 | 7/2005 | Hilgarth |
| 6,921,780 B2 | 7/2005 | Ducros et al. |
| 6,924,027 B2 | 8/2005 | Matayabas et al. |
| 6,926,955 B2 | 8/2005 | Jayaraman et al. |
| 6,940,721 B2 | 9/2005 | Hill |
| 6,946,190 B2 | 9/2005 | Bunyan |
| 6,956,739 B2 | 10/2005 | Bunyan |
| 6,975,944 B1 | 12/2005 | Zenhausern |
| 6,984,685 B2 | 1/2006 | Misra et al. |
| 7,013,965 B2 | 3/2006 | Zhong et al. |
| 7,038,009 B2 | 5/2006 | Sagal et al. |
| 7,056,566 B2 | 6/2006 | Freuler et al. |
| 7,074,490 B2 | 7/2006 | Feng et al. |
| 7,078,109 B2 | 7/2006 | Hill et al. |
| 7,119,143 B2 | 10/2006 | Jarnjevic et al. |
| 7,135,232 B2 | 11/2006 | Yamada et al. |
| 7,147,367 B2 | 12/2006 | Balian et al. |
| 7,172,711 B2 | 2/2007 | Nguyen |
| 7,208,191 B2 | 4/2007 | Freedman |
| 7,241,707 B2 | 7/2007 | Meagley et al. |
| 7,244,491 B2 | 7/2007 | Nguyen |
| 7,253,523 B2 | 8/2007 | Dani et al. |
| 7,262,369 B1 | 8/2007 | English |
| 7,291,396 B2 | 11/2007 | Huang et al. |
| 7,294,394 B2 | 11/2007 | Jayaraman et al. |
| RE39,992 E | 1/2008 | Misra et al. |
| 7,326,042 B2 | 2/2008 | Alper et al. |
| 7,328,547 B2 | 2/2008 | Mehta et al. |
| 7,369,411 B2 | 5/2008 | Hill et al. |
| 7,440,281 B2 | 10/2008 | Bailey et al. |
| 7,446,158 B2 | 11/2008 | Okamoto et al. |
| 7,462,294 B2 | 12/2008 | Kumar et al. |
| 7,463,496 B2 | 12/2008 | Robinson et al. |
| 7,465,605 B2 | 12/2008 | Raravikar et al. |
| 7,538,075 B2 | 5/2009 | Yamada et al. |
| 7,550,097 B2 | 6/2009 | Tonapi et al. |
| 7,572,494 B2 | 8/2009 | Mehta et al. |
| 7,608,324 B2 | 10/2009 | Nguyen et al. |
| 7,641,811 B2 | 1/2010 | Kumar et al. |
| 7,646,778 B2 | 1/2010 | Sajassi |
| 7,682,690 B2 | 3/2010 | Bunyan et al. |
| 7,695,817 B2 | 4/2010 | Lin et al. |
| 7,700,943 B2 | 4/2010 | Raravikar et al. |
| 7,732,829 B2 | 6/2010 | Murphy |
| 7,744,991 B2 | 6/2010 | Fischer et al. |
| 7,763,673 B2 | 7/2010 | Okamoto et al. |
| RE41,576 E | 8/2010 | Bunyan et al. |
| 7,765,811 B2 | 8/2010 | Hershberger et al. |
| 7,807,756 B2 | 10/2010 | Wakabayashi et al. |
| 7,816,785 B2 | 10/2010 | Iruvanti et al. |
| 7,842,381 B2 | 11/2010 | Johnson |
| 7,846,778 B2 | 12/2010 | Rumer et al. |
| 7,850,870 B2 | 12/2010 | Ahn et al. |
| 7,867,609 B2 | 1/2011 | Nguyen |
| 7,893,170 B2 | 2/2011 | Wakioka et al. |
| 7,955,900 B2 | 6/2011 | Jadhav et al. |
| 7,960,019 B2 | 6/2011 | Jayaraman et al. |
| 7,973,108 B2 | 7/2011 | Okamoto et al. |
| 8,009,429 B1 | 8/2011 | Sundstrom et al. |
| 8,039,961 B2 | 10/2011 | Suhir et al. |
| 8,076,773 B2 | 12/2011 | Jewram et al. |
| 8,081,468 B2 | 12/2011 | Hill et al. |
| 8,102,058 B2 | 1/2012 | Hsieh et al. |
| 8,105,504 B2 | 1/2012 | Gerster et al. |
| 8,110,919 B2 | 2/2012 | Jewram et al. |
| 8,112,884 B2 | 2/2012 | Tullidge et al. |
| 8,115,303 B2 | 2/2012 | Bezama et al. |
| 8,138,239 B2 | 3/2012 | Prack et al. |
| 8,167,463 B2 | 5/2012 | Loh |
| 8,223,498 B2 | 7/2012 | Lima |
| 8,308,861 B2 | 11/2012 | Rolland et al. |
| 8,324,313 B2 | 12/2012 | Funahashi |
| 8,362,607 B2 | 1/2013 | Scheid et al. |
| 8,373,283 B2 | 2/2013 | Masuko et al. |
| 8,431,647 B2 | 4/2013 | Dumont et al. |
| 8,431,655 B2 | 4/2013 | Dershem |
| 8,445,102 B2 | 5/2013 | Strader et al. |
| 8,518,302 B2 | 8/2013 | Gerster et al. |
| 8,535,478 B2 | 9/2013 | Pouchelon et al. |
| 8,535,787 B1 | 9/2013 | Lima |
| 8,557,896 B2 | 10/2013 | Jeong et al. |
| 8,586,650 B2 | 11/2013 | Zhang et al. |
| 8,587,945 B1 | 11/2013 | Hartmann et al. |
| 8,618,211 B2 | 12/2013 | Bhagwagar et al. |
| 8,632,879 B2 | 1/2014 | Weisenberger |
| 8,633,478 B2 | 1/2014 | Cummings et al. |
| 8,638,001 B2 | 1/2014 | Kimura et al. |
| 8,647,752 B2 | 2/2014 | Strader et al. |
| 8,758,892 B2 | 6/2014 | Bergin et al. |
| 8,796,068 B2 | 8/2014 | Stender et al. |
| 8,837,151 B2 | 9/2014 | Hill et al. |
| 8,865,800 B2 | 10/2014 | Stammer et al. |
| 8,917,510 B2 | 12/2014 | Boday et al. |
| 8,937,384 B2 | 1/2015 | Bao et al. |
| 9,055,694 B2 | 6/2015 | Lima |
| 9,070,660 B2 | 6/2015 | Lowe et al. |
| 9,080,000 B2 | 7/2015 | Ahn et al. |
| 9,222,735 B2 | 12/2015 | Hill et al. |
| 9,260,645 B2 | 2/2016 | Bruzda |
| 9,353,304 B2 | 5/2016 | Merrill et al. |
| 9,392,730 B2 | 7/2016 | Hartmann et al. |
| 9,481,851 B2 | 11/2016 | Matsumoto et al. |
| 9,527,988 B2 | 12/2016 | Habimana et al. |
| 9,537,095 B2 | 1/2017 | Stender et al. |
| 9,593,209 B2 | 3/2017 | Dent et al. |
| 9,593,275 B2 | 3/2017 | Tang et al. |
| 9,598,575 B2 | 3/2017 | Bhagwagar et al. |
| 10,155,894 B2 | 12/2018 | Liu et al. |
| 10,287,471 B2 | 5/2019 | Zhang et al. |
| 10,312,177 B2 | 6/2019 | Zhang et al. |
| 10,501,671 B2 | 12/2019 | Zhang et al. |
| 10,781,349 B2 | 9/2020 | Zhang et al. |
| 2002/0018885 A1 | 2/2002 | Takahashi et al. |
| 2002/0132896 A1 | 9/2002 | Nguyen |
| 2002/0140082 A1 | 10/2002 | Matayabas |
| 2002/0143092 A1 | 10/2002 | Matayabas |
| 2003/0031876 A1 | 2/2003 | Obeng et al. |
| 2003/0068487 A1 | 4/2003 | Nguyen et al. |
| 2003/0112603 A1 | 6/2003 | Roesner et al. |
| 2003/0128521 A1 | 7/2003 | Matayabas et al. |
| 2003/0151030 A1 | 8/2003 | Gurin |
| 2003/0159938 A1 | 8/2003 | Hradil |
| 2003/0171487 A1 | 9/2003 | Ellsworth et al. |
| 2003/0178139 A1 | 9/2003 | Clouser et al. |
| 2003/0203181 A1 | 10/2003 | Ellsworth et al. |
| 2003/0207064 A1 | 11/2003 | Bunyan et al. |

(56) References Cited

U.S. PATENT DOCUMENTS

| | | |
|---|---|---|
| 2003/0207128 A1 | 11/2003 | Uchiya et al. |
| 2003/0230403 A1 | 12/2003 | Webb |
| 2004/0037965 A1 | 2/2004 | Salter |
| 2004/0053059 A1 | 3/2004 | Mistele |
| 2004/0069454 A1 | 4/2004 | Bonsignore et al. |
| 2004/0097635 A1 | 5/2004 | Fan et al. |
| 2004/0149587 A1 | 8/2004 | Hradil |
| 2004/0161571 A1 | 8/2004 | Duvall et al. |
| 2004/0206941 A1 | 10/2004 | Gurin |
| 2005/0020738 A1 | 1/2005 | Jackson et al. |
| 2005/0025984 A1 | 2/2005 | Odell et al. |
| 2005/0045855 A1 | 3/2005 | Tonapi et al. |
| 2005/0072334 A1 | 4/2005 | Czubarow et al. |
| 2005/0110133 A1 | 5/2005 | Yamada et al. |
| 2005/0148721 A1 | 7/2005 | Tonapi et al. |
| 2005/0228097 A1 | 10/2005 | Zhong |
| 2005/0256291 A1 | 11/2005 | Okamoto et al. |
| 2005/0287362 A1 | 12/2005 | Garcia-Ramirez et al. |
| 2006/0040112 A1 | 2/2006 | Dean et al. |
| 2006/0057364 A1 | 3/2006 | Nguyen |
| 2006/0094809 A1 | 5/2006 | Simone et al. |
| 2006/0122304 A1 | 6/2006 | Matayabas, Jr. |
| 2006/0155029 A1 | 7/2006 | Zucker |
| 2006/0208354 A1 | 9/2006 | Liu et al. |
| 2006/0228542 A1 | 10/2006 | Czubarow |
| 2006/0260948 A2 | 11/2006 | Zschintzsch et al. |
| 2006/0264566 A1 | 11/2006 | Cassar et al. |
| 2007/0013054 A1 | 1/2007 | Ruchert et al. |
| 2007/0051773 A1 | 3/2007 | Ruchert et al. |
| 2007/0097651 A1 | 5/2007 | Canale et al. |
| 2007/0116626 A1 | 5/2007 | Pan et al. |
| 2007/0131913 A1 | 6/2007 | Cheng et al. |
| 2007/0161521 A1 | 7/2007 | Sachdev et al. |
| 2007/0164424 A1 | 7/2007 | Dean et al. |
| 2007/0166554 A1 | 7/2007 | Ruchert et al. |
| 2007/0179232 A1 | 8/2007 | Collins et al. |
| 2007/0219312 A1 | 9/2007 | David |
| 2007/0241303 A1 | 10/2007 | Zhong et al. |
| 2007/0241307 A1 | 10/2007 | Nguyen |
| 2007/0249753 A1 | 10/2007 | Lin et al. |
| 2007/0293604 A1 | 12/2007 | Frenkel et al. |
| 2008/0021146 A1 | 1/2008 | Komatsu et al. |
| 2008/0023665 A1 | 1/2008 | Weiser et al. |
| 2008/0044670 A1 | 2/2008 | Nguyen |
| 2008/0110609 A1 | 5/2008 | Fann et al. |
| 2008/0116416 A1 | 5/2008 | Chacko |
| 2008/0141629 A1 | 6/2008 | Alper et al. |
| 2008/0149176 A1 | 6/2008 | Sager et al. |
| 2008/0269405 A1 | 10/2008 | Okamoto et al. |
| 2008/0291634 A1 | 11/2008 | Weiser et al. |
| 2008/0302064 A1 | 12/2008 | Rauch |
| 2009/0053515 A1 | 2/2009 | Luo et al. |
| 2009/0072408 A1 | 3/2009 | Kabir et al. |
| 2009/0111925 A1 | 4/2009 | Burnham et al. |
| 2009/0184283 A1 | 7/2009 | Chung et al. |
| 2010/0040768 A1 | 2/2010 | Dhindsa |
| 2010/0048435 A1 | 2/2010 | Yamagata et al. |
| 2010/0048438 A1 | 2/2010 | Carey et al. |
| 2010/0075135 A1 | 3/2010 | Kendall et al. |
| 2010/0129648 A1 | 5/2010 | Xu et al. |
| 2010/0197533 A1 | 8/2010 | Kendall et al. |
| 2010/0256280 A1 | 10/2010 | Bruzda |
| 2010/0304152 A1 | 12/2010 | Clarke |
| 2011/0000516 A1 | 1/2011 | Hershberger et al. |
| 2011/0038124 A1 | 2/2011 | Burnham et al. |
| 2011/0121435 A1 | 5/2011 | Mitsukura et al. |
| 2011/0141698 A1 | 6/2011 | Chiou et al. |
| 2011/0187009 A1 | 8/2011 | Masuko et al. |
| 2011/0192564 A1* | 8/2011 | Mommer ............ H01M 10/658 165/10 |
| 2011/0204280 A1 | 8/2011 | Bruzda |
| 2011/0205708 A1 | 8/2011 | Andry et al. |
| 2011/0265979 A1 | 11/2011 | Chen et al. |
| 2011/0294958 A1 | 12/2011 | Ahn et al. |
| 2011/0308782 A1 | 12/2011 | Merrill et al. |
| 2012/0048528 A1 | 3/2012 | Bergin et al. |
| 2012/0060826 A1 | 3/2012 | Weisenberger |
| 2012/0087094 A1 | 4/2012 | Hill et al. |
| 2012/0142832 A1 | 6/2012 | Varma et al. |
| 2012/0174956 A1 | 7/2012 | Smythe et al. |
| 2012/0182693 A1 | 7/2012 | Boday et al. |
| 2012/0195822 A1 | 8/2012 | Werner et al. |
| 2012/0253033 A1 | 10/2012 | Boucher et al. |
| 2012/0280382 A1 | 11/2012 | Im et al. |
| 2012/0285673 A1 | 11/2012 | Cola et al. |
| 2012/0288725 A1 | 11/2012 | Tanaka et al. |
| 2012/0292005 A1 | 11/2012 | Bruzda et al. |
| 2013/0127069 A1 | 5/2013 | Boday et al. |
| 2013/0199724 A1 | 8/2013 | Dershem |
| 2013/0248163 A1 | 9/2013 | Bhagwagar et al. |
| 2013/0265721 A1 | 10/2013 | Strader et al. |
| 2013/0285233 A1 | 10/2013 | Bao et al. |
| 2013/0288462 A1 | 10/2013 | Stender et al. |
| 2013/0299140 A1 | 11/2013 | Ling et al. |
| 2014/0043754 A1 | 2/2014 | Hartmann et al. |
| 2014/0190672 A1 | 7/2014 | Swaroop et al. |
| 2014/0264818 A1 | 9/2014 | Lowe et al. |
| 2015/0000151 A1 | 1/2015 | Roth et al. |
| 2015/0008361 A1 | 1/2015 | Hattori |
| 2015/0125646 A1 | 5/2015 | Tournilhac et al. |
| 2015/0138739 A1 | 5/2015 | Hishiki |
| 2015/0158982 A1 | 6/2015 | Saito et al. |
| 2015/0183951 A1 | 7/2015 | Bhagwagar et al. |
| 2015/0275060 A1 | 10/2015 | Kuroda et al. |
| 2015/0279762 A1 | 10/2015 | Lowe et al. |
| 2015/0307743 A1 | 10/2015 | Ireland et al. |
| 2016/0009865 A1 | 1/2016 | Jiang et al. |
| 2016/0160102 A1 | 6/2016 | Minegishi et al. |
| 2016/0160104 A1 | 6/2016 | Bruzda et al. |
| 2016/0226114 A1 | 8/2016 | Hartmann et al. |
| 2016/0272839 A1 | 9/2016 | Yamamoto et al. |
| 2017/0009362 A1 | 1/2017 | Werner et al. |
| 2017/0018481 A1 | 1/2017 | Zeng et al. |
| 2017/0107415 A1 | 4/2017 | Shiono |
| 2017/0137685 A1 | 5/2017 | Liu et al. |
| 2017/0167716 A1 | 6/2017 | Ezaki et al. |
| 2017/0226396 A1 | 8/2017 | Yang et al. |
| 2017/0243849 A1 | 8/2017 | Sasaki et al. |
| 2017/0317257 A1 | 11/2017 | Ezaki et al. |
| 2017/0321100 A1 | 11/2017 | Zhang et al. |
| 2018/0030327 A1 | 2/2018 | Zhang et al. |
| 2018/0030328 A1 | 2/2018 | Zhang et al. |
| 2018/0085977 A1 | 3/2018 | Ezaki |
| 2018/0194982 A1 | 7/2018 | Ezaki et al. |
| 2018/0267315 A1 | 9/2018 | Yonemura |
| 2018/0358283 A1 | 12/2018 | Zhang et al. |
| 2018/0370189 A1 | 12/2018 | Tang et al. |
| 2019/0048245 A1 | 2/2019 | Liu et al. |
| 2019/0085225 A1 | 3/2019 | Zhang et al. |
| 2019/0092993 A1 | 3/2019 | Naik et al. |
| 2019/0119544 A1 | 4/2019 | Shen et al. |
| 2019/0122954 A1 | 4/2019 | Bruzda et al. |
| 2019/0249007 A1 | 8/2019 | Shen et al. |

FOREIGN PATENT DOCUMENTS

| | | |
|---|---|---|
| CN | 1407141 A | 4/2003 |
| CN | 1456710 A | 11/2003 |
| CN | 1549875 A | 11/2004 |
| CN | 1580116 A | 2/2005 |
| CN | 1638952 A | 7/2005 |
| CN | 1940007 A | 4/2007 |
| CN | 1970666 A | 5/2007 |
| CN | 1972988 A | 5/2007 |
| CN | 100351075 C | 11/2007 |
| CN | 101067030 A | 11/2007 |
| CN | 101090922 B | 12/2007 |
| CN | 101113241 A | 1/2008 |
| CN | 101126016 A | 2/2008 |
| CN | 100394566 C | 6/2008 |
| CN | 101288353 A | 10/2008 |
| CN | 101445627 A | 6/2009 |
| CN | 101525489 A | 9/2009 |
| CN | 101735619 B | 6/2010 |

(56) References Cited

FOREIGN PATENT DOCUMENTS

| | | |
|---|---|---|
| CN | 101835830 B | 9/2010 |
| CN | 101942197 A | 1/2011 |
| CN | 102134474 B | 7/2011 |
| CN | 102341474 B | 2/2012 |
| CN | 102627943 A | 8/2012 |
| CN | 102634212 A | 8/2012 |
| CN | 102348763 B | 4/2013 |
| CN | 103087389 A | 5/2013 |
| CN | 103102552 A | 5/2013 |
| CN | 103102689 A | 5/2013 |
| CN | 103131138 B | 6/2013 |
| CN | 103214848 A | 7/2013 |
| CN | 103254647 A | 8/2013 |
| CN | 103333447 A | 10/2013 |
| CN | 103409116 B | 11/2013 |
| CN | 103436027 B | 12/2013 |
| CN | 103709757 A | 4/2014 |
| CN | 103756631 A | 4/2014 |
| CN | 103773322 A | 5/2014 |
| CN | 103849356 A | 6/2014 |
| CN | 103865271 B | 6/2014 |
| CN | 104098914 A | 10/2014 |
| CN | 104136569 A | 11/2014 |
| CN | 104140678 B | 11/2014 |
| CN | 104152103 A | 11/2014 |
| CN | 104194733 A | 12/2014 |
| CN | 104449550 A | 3/2015 |
| CN | 104471012 A | 3/2015 |
| CN | 104497574 A | 4/2015 |
| CN | 104513487 A | 4/2015 |
| CN | 104804705 A | 7/2015 |
| CN | 104861661 A | 8/2015 |
| CN | 105111750 A | 12/2015 |
| CN | 105349113 A | 2/2016 |
| CN | 105419339 A | 3/2016 |
| CN | 104479623 B | 5/2016 |
| CN | 105566920 A | 5/2016 |
| CN | 105670555 A | 6/2016 |
| CN | 103923463 B | 8/2016 |
| CN | 105838322 A | 8/2016 |
| CN | 105925243 A | 9/2016 |
| CN | 105980512 A | 9/2016 |
| CN | 106221236 A | 12/2016 |
| CN | 106243720 A | 12/2016 |
| CN | 107057370 A | 8/2017 |
| DE | 102007037435 A1 | 2/2009 |
| DE | 102009001722 A1 | 9/2010 |
| EP | 0466188 A1 | 1/1992 |
| EP | 0519138 A2 | 12/1992 |
| EP | 0816423 A1 | 1/1998 |
| EP | 1099734 A1 | 5/2001 |
| EP | 1224669 B1 | 7/2002 |
| EP | 1291913 A2 | 3/2003 |
| EP | 1414063 A2 | 4/2004 |
| EP | 1149519 B1 | 11/2004 |
| EP | 1514956 B1 | 3/2005 |
| EP | 1629059 B1 | 3/2006 |
| EP | 2194165 A1 | 6/2010 |
| FR | 2848215 A1 | 6/2004 |
| GB | 2508320 B | 5/2014 |
| JP | 57027188 B | 6/1982 |
| JP | 0543116 B2 | 5/1986 |
| JP | 3662715 B2 | 1/1991 |
| JP | 06-209057 A | 7/1994 |
| JP | 02611364 B2 | 5/1997 |
| JP | 2000143808 A | 5/2000 |
| JP | 2001139818 A | 5/2001 |
| JP | 2002003830 A | 1/2002 |
| JP | 2003-218296 A | 7/2003 |
| JP | 100479857 B1 | 7/2003 |
| JP | 2005-032468 A | 2/2005 |
| JP | 2006-502248 A | 1/2006 |
| JP | 2007002002 A | 1/2007 |
| JP | 2007-106809 A | 4/2007 |
| JP | 2007-131798 A | 5/2007 |
| JP | 4016326 B2 | 12/2007 |
| JP | 2008063412 A | 3/2008 |
| JP | 5269366 B2 | 3/2009 |
| JP | 2009102577 A | 5/2009 |
| JP | 5137538 B2 | 6/2009 |
| JP | 2009138036 A | 6/2009 |
| JP | 4288469 B2 | 7/2009 |
| JP | 5607298 B2 | 3/2010 |
| JP | 2010-120979 A | 6/2010 |
| JP | 4480457 B2 | 6/2010 |
| JP | 5390202 B2 | 8/2010 |
| JP | 2010-248349 A | 11/2010 |
| JP | 2010248277 A | 11/2010 |
| JP | 2010278115 A | 12/2010 |
| JP | 5318733 B2 | 6/2011 |
| JP | 2011-144234 A | 7/2011 |
| JP | 2011165792 A | 8/2011 |
| JP | 2012-119725 A | 6/2012 |
| JP | 2012-201106 A | 10/2012 |
| JP | 5687167 B2 | 4/2013 |
| JP | 5463116 B2 | 4/2014 |
| JP | 2014-105283 A | 6/2014 |
| JP | 5944306 B2 | 7/2014 |
| JP | 5372270 B1 | 9/2014 |
| JP | 2014194006 A | 10/2014 |
| JP | 2015-212318 A | 11/2015 |
| JP | 2016-506992 A | 3/2016 |
| JP | 2016-216523 A | 12/2016 |
| JP | 2019-522711 A | 8/2019 |
| KR | 10-0685013 B1 | 2/2007 |
| KR | 10-2007-0089169 A | 8/2007 |
| KR | 20070116654 A | 12/2007 |
| KR | 10-0820902 B1 | 4/2008 |
| KR | 0953679 B1 | 4/2010 |
| KR | 1175948 B1 | 8/2012 |
| KR | 10-2015-0049376 A | 5/2015 |
| KR | 10-2016-0130273 A | 11/2016 |
| TW | 569348 13 | 1/2004 |
| TW | 200907040 A | 2/2009 |
| TW | 201033268 A | 9/2010 |
| TW | 201527309 A | 7/2015 |
| TW | 201546257 A | 12/2015 |
| WO | 87/06492 A1 | 11/1987 |
| WO | 1997026297 A1 | 7/1997 |
| WO | WO0120618 A1 | 3/2001 |
| WO | 01/93648 A2 | 12/2001 |
| WO | 03052818 A1 | 6/2003 |
| WO | 2003064148 A1 | 8/2003 |
| WO | 2004/001844 A2 | 12/2003 |
| WO | 2004008497 A2 | 1/2004 |
| WO | 2004022330 A1 | 3/2004 |
| WO | 2005021257 A1 | 3/2005 |
| WO | 2005/111146 A1 | 11/2005 |
| WO | 200511146 A1 | 11/2005 |
| WO | 2005119771 A1 | 12/2005 |
| WO | 2006/014171 A1 | 2/2006 |
| WO | 2006023860 A2 | 3/2006 |
| WO | 2007027670 A1 | 3/2007 |
| WO | 2008014171 A2 | 1/2008 |
| WO | 2008103219 A1 | 8/2008 |
| WO | 2008121491 A1 | 10/2008 |
| WO | 2008121970 A1 | 10/2008 |
| WO | 2009032212 A1 | 3/2009 |
| WO | 2010/104534 A1 | 9/2010 |
| WO | 2010/104542 A1 | 9/2010 |
| WO | 2013/074920 A1 | 5/2013 |
| WO | 2013/129600 A1 | 9/2013 |
| WO | 2013/168291 A1 | 11/2013 |
| WO | 2013191116 A1 | 12/2013 |
| WO | 2014007119 A1 | 1/2014 |
| WO | 2014/021980 A1 | 2/2014 |
| WO | 2014160067 A1 | 10/2014 |
| WO | 2015/120773 A1 | 8/2015 |
| WO | 2015/131370 A1 | 9/2015 |
| WO | 2015179056 A1 | 11/2015 |
| WO | 2016004565 A1 | 1/2016 |
| WO | 2016103424 A1 | 6/2016 |
| WO | 2016/111139 A1 | 7/2016 |

(56) References Cited

FOREIGN PATENT DOCUMENTS

| WO | 20181022288 A2 | 2/2018 |
|---|---|---|
| WO | 20181022293 A2 | 2/2018 |
| WO | WO2018068222 A1 | 4/2018 |

OTHER PUBLICATIONS

International Search Report and Written Opinion issued in PCT/CN2014/093138, dated Sep. 6, 2015, 8 pages.
International Search Report and Written Opinion issued in PCT/CN2015/072202, dated Apr. 29, 2015, 14 pages.
International Search Report and Written Opinion issued in PCT/US2009/069090, dated Aug. 17, 2010, 6 pages.
International Search Report and Written Opinion received for PCT Patent Application No. PCT/US17/41447, dated Oct. 19, 2017, 10 pages.
International Search Report and Written Opinion received for PCT Patent Application No. PCT/US2019/017743, dated May 28, 2019, 10 pages.
Search Report issued in Chinese patent application 201410411725X (with English Translation), report dated Jul. 6, 2016, 4 pages.
Singaporean Written Opinion issued in SG Application No. 11201704238Y, completed Apr. 11, 2019, 5 pages.
Evonik, Silanes for Adhesives and Sealants, 2013, p. 1-24.
International Preliminary Report on Patentability issued in PCT/CN2016/075827, dated Sep. 20, 2018, 5 pages.
International Search Report and Written Opinion issued in PCT/CN2016/075827, dated Dec. 1, 2016, 7 pages.
International Search Report and Written Opinion issued in PCT/US2018/049218, dated Dec. 28, 2018, 13 pages.
International Search Report and Written Opinion issued in PCT/US2018/056870, dated Feb. 8, 2019, 9 pages.
Singaporean Written Opinion issued in SG Application No. 11201704238Y, completed Feb. 7, 2019, 7 pages.
Wacker Silicones, Catalyst EP/Inhibitor PT 88 product data sheet, p. 1-3, Oct. 6, 2008.
"Dynasylan 1146: Oligomeric Diamino-Silane-System" Evonik Industries, pp. 1-3, 2008.
"Hi-Flow 225F-AC Reinforced, Phase Change Thermal Interface Material," The Bergquist Company, 1 page, available at least as early as Aug. 31, 2017.
"Semicosil 9212A." Wacker Silicones Material Safety Data Sheet, pp. 1-8, printed Dec. 11, 2009.
"Semicosil 9212B." Wacker Silicones Material Safety Data Sheet, pp. 1-8, printed Dec. 11, 2009.
"THERM-A-GAP HCS10,569,570,579 and 580 Thermally Conductive Gap Filler Pads," Parker Chomerics, Engineering Your Success, pp. 11-12, available at least as early as the filed of the present application.

Aranzabe, Estibaliz, et al. "More than Color: Pigments with Thermal Storage Capacity; Processing and Degradation Behavior." Advances in Materials Physics and Chemistry, 5:171-184, 2015.
Extended European Search Report issued in EP Application 14867847.7, dated Jun. 26, 2017, 7 pages.
Extended European Search Report issued in EP Application No. 14897036.1, dated Jul. 2, 2018, 7 pages.
Extended Search Report issued in EP Application 14907530.1, dated Jun. 27, 2018, 9 pages.
Fink, Johannes Karl. "Chapter 18: Metal Deactivators." in: A Concise Introduction to Additives for Thermoplastic Polymers, Wiley-Scrivener, pp. 165-171, Jan. 1, 2010.
Gowda, Arun, et al. "Choosing the Right Thermal Interface Material." Solid State Technology, Insights for Electronics Manufacturing, Online Blog, 9 pages, 2005. Retrieved May 25, 2017 from the Internet <http://electroiq.com/blog/2005/03/choosing-the-right-thermal-interface-material/.
International Search Report and Written Opinion issued in PCT/CN2014/081724, dated Apr. 1, 2015, 12 pages.
International Search Report and Written Opinion issued in PCT/CN2016/101874, dated Apr. 28, 2017, 12 pages.
International Search Report and Written Opinion issued in PCT/US2014/068033, dated Mar. 26, 2015, 12 pages.
International Search Report and Written Opinion issued in PCT/US2017/041498, dated Oct. 20, 2017, 10 pages.
Martyak et al., On the oxidation of tin(II) in methanesulfonate solutions and the role of sulfate, Galvanotechnik (2005), 96(3), 594-601 (Abstract).
Ping, Ding, et al. "Preparation and Application Research of Novel Silicone Gel for High-Power IGBT." Insulating Materials, 47(2):52-55, Chinese text with English translation of Abstract, 2014.
Ramaswamy, C., et al. "Phase Change Materials as a Viable Thermal Interface Material for High-Power Electronic Applications." The Ninth Intersociety Conference on Thermal and Thermomechanical Phenomena in Electronic Systems, IEEE, 2:687-691, 2004.
Search Report issued in CN application 201480066502.2, dated May 18, 2017, 2 pages.
Singaporean Search Report and Written Opinion issued in SG Application No. 11201704238Y, completed May 18, 2018, 9 pages.
Yasuhiro Aoyagi et al., "Effects of antioxidants and the solild component on the thermal stability of polyol-ester-based termal pastes", J Mater Sci (2007) 42:2358-2375; Mar. 12, 2007.
Yasuhiro Aoyagi et al., "Polyol-Based Phase-Change Thermal Interface Materials", Journal of Electronic Materials, vol. 35, No. 3, (2006); pp: 416-424.
Yunsheng Xu et al., "Lithium Doped Polyethylene-Glycol-Based Thermal Interface Pastes for High Thermal Contact Conductance", Transactions of the ASME; Journal of Electronic Packagiing, vol. 124, Sep. 2002; pp: 188-191.
Dow Corning® Two-Part RTV Silicone Sealant: Total Assembly Solutions for Home Appliance Production; www.dowcorning.com; Form No. 80-3375-01; 6 pages.

\* cited by examiner 1.6mm 0.3mm

Sample 3

125°C/24hrs
Example 5

125°C/24hrs
Example 6

125°C/24hrs
Example 7

Example 5

Example 6

Example 7

SILICONE-FREE THERMAL GEL

CROSS-REFERENCE TO RELATED APPLICATIONS

This application claims the benefit under Title 35, U.S.C. § 119(e) of U.S. Provisional Patent Application Ser. No. 62/555,954, entitled SILICONE-FREE THERMAL GEL, filed on Sep. 8, 2017, the disclosure of which is expressly incorporated by reference herein in its entirety.

FIELD OF THE INVENTION

The present disclosure relates generally to thermal interface materials, and more particularly to a silicone-free thermal gel used in thermal interface materials.

DESCRIPTION OF THE RELATED ART

Thermal interface materials (TIMs) and thermal gels are widely used to dissipate heat from electronic components, such as central processing units, video graphics arrays, servers, game consoles, smart phones, LED boards, and the like. Thermal interface materials are typically used to transfer excess heat from the electronic component to a heat spreader, such as a heat sink.

Traditional thermal gels are silicone containing compounds, which can be a good matrix for fillers and provide good flowability for the final composite. However, for some high voltage applications, some of the silicone containing components of the composite could potentially leak from the composite, resulting in a residue which may partially burn, and non-conductive silicon oxide may form on the electrode, which may affect the electrode conductivity and further damage the device functionality.

Improvements in the foregoing are desired.

SUMMARY OF THE INVENTION

The present disclosure provides a thermal interface material in the form of a silicone free gel that is useful in transferring heat from heat generating electronic devices, such as computer chips, to heat dissipating structures, such as heat spreaders and heat sinks. The thermal interface material includes a polyether polyol, a cross-linker, a coupling agent, an antioxidant, a catalyst, and at least one thermally conductive filler.

In one exemplary embodiment, a thermal gel is provided. The thermal gel includes a matrix including at least one polyether polyol present in an amount between 1 wt. % and 10 wt. % based on the total weight of the thermal gel; a catalyst present in an amount between 0.3 wt. % and 0.6 wt. % based on the total weight of the thermal gel; a crosslinker including a plurality of reactive amine groups, the crosslinker present in an amount between 0.5 wt. % and 2 wt. % based on the total weight of the thermal gel; a coupling agent present in an amount between 0.1 wt. % and 5 wt. % based on the total weight of the thermal gel; and at least one thermally conductive filler present in an amount between 80 wt. % and 98 wt. % based on the total weight of the thermal gel.

In one more particular embodiment of any of the above embodiments, the thermal gel further includes: an antioxidant present in an amount between 0.2 wt. % and 0.4 wt. % based on the total weight of the thermal gel. In one more particular embodiment of any of the above embodiments, the thermal gel includes silicone based components in an amount less than 1 wt. % based on the total weight of the thermal gel. In one more particular embodiment of any of the above embodiments, the thermal gel has a cure temperature of below 150° C. In one more particular embodiment of any of the above embodiments, the polyol is a polyether polyol, the polyether polyol is a bi-ol polymer with a molecular weight between 200 and 10000 Daltons. In one more particular embodiment of any of the above embodiments, the at least one polyether polyol is present in an amount between 5 wt. % and 10 wt. % based on the total weight of the thermal gel. In one more particular embodiment of any of the above embodiments, the crosslinker is an alkylated melamine formaldehyde resin.

In one more particular embodiment of any of the above embodiments, the catalyst includes amine neutralized benzene sulfonic acid, amine neutralized dinonylnaphthalene disulfonic acid or amine neutralized dinonylnaphthalenesulfonic acid or other type of thermal acid generator. In one more particular embodiment of any of the above embodiments, the antioxidant includes at least one antioxidant selected from the group consisting of a phenol-type antioxidant, an amine-type antioxidant, or a sterically hindered, sulfur containing phenolic antioxidant. In one more particular embodiment of any of the above embodiments, the at least one thermally conductive filler includes a first thermally conductive filler and a second thermally conductive filler; the first thermally conductive filler is present in an amount between 35 wt. % and 50 wt. % based on the total weight of the thermal gel; the second thermally conductive filler is present in an amount between 15 wt. % and 25 wt. % based on the total weight of the thermal gel; and the third thermally conductive filler is present in an amount between 15 wt. % and 25 wt. % based on the total weight of the thermal gel.

In another exemplary embodiment, a method of preparing a thermal gel is provided. The method includes: adding at least one polyether polyol, at least one coupling agent, at least one antioxidant, and at least one crosslinker to a reaction vessel to form a mixture; the at least one polyether polyol present in an amount between 1 wt. % and 10 wt. % based on the total weight of the thermal gel; the at least one crosslinker including a plurality of reactive amine groups, the crosslinker present in an amount between 0.5 wt. % and 2 wt. % based on the total weight of the thermal gel; the at least one coupling agent present in an amount between 0.1 wt. % and 5 wt. % based on the total weight of the thermal gel; adding a catalyst to the reaction vessel, the catalyst present in an amount between 0.3 wt. % and 0.6 wt. % based on the total weight of the thermal gel; agitating the mixture; adding at least one thermally conductive filler to the reaction vessel, wherein the at least one thermally conductive filler present in an amount between 80 wt. % and 98 wt. % based on the total weight of the thermal gel; and cooling the mixture to room temperature.

In one more particular embodiment of any of the above embodiments, the at least one antioxidant is present in an amount between 0.2 wt. % and 0.4 wt. % based on the total weight of the thermal gel. In one more particular embodiment of any of the above embodiments, the thermal gel includes silicone containing components in an amount less than 1 wt. %. In one more particular embodiment of any of the above embodiments, the polyol is a polyether polyol, the polyether polyol is a bi-ol polymer with a molecular weight between 200 and 10000 Daltons. In one more particular embodiment of any of the above embodiments, the at least one polyether polyol is present in an amount between 5 wt. % and 10 wt. % based on the total weight of the thermal gel.

In one more particular embodiment of any of the above embodiments, the crosslinker is an alkylated melamine formaldehyde resin.

In one more particular embodiment of any of the above embodiments, the antioxidant includes at least one antioxidant selected from the group consisting of a phenol-type antioxidant, an amine-type antioxidant, or a sterically hindered, sulfur containing phenolic antioxidant. In one more particular embodiment of any of the above embodiments, the catalyst includes amine neutralized benzene sulfonic acid, amine neutralized dinonylnaphthalene disulfonic acid or amine neutralized dinonylnaphthalenesulfonic acid or other type of thermal acid generator. In one more particular embodiment of any of the above embodiments, the at least one thermally conductive filler includes a first thermally conductive filler, a second thermally conductive filler, and a third thermally conductive filler; the first thermally conductive filler is present in an amount between 35 wt. % and 50 wt. % based on the total weight of the thermal gel; the second thermally conductive filler is present in an amount between 15 wt. % and 25 wt. % based on the total weight of the thermal gel; and the third thermally conductive filler is present in an amount between 15 wt. % and 25 wt. % based on the total weight of the thermal gel.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

A. Thermal Gel

Figure 1:
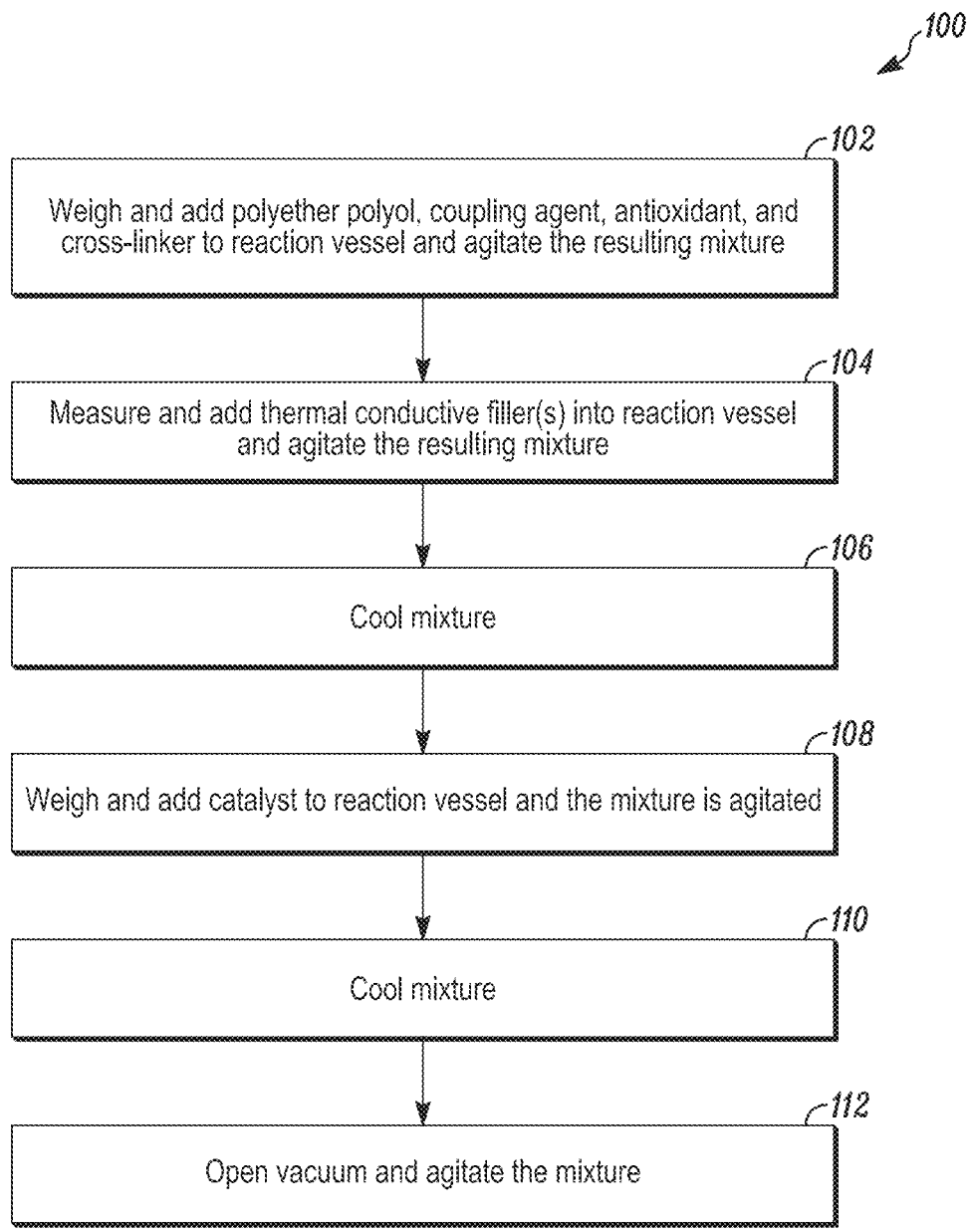
FIG. 1 is a flowchart relating to a method of preparing a silicone-free thermal gel.

The present invention relates to a thermal gel that is useful in transferring heat away from electronic components. In one exemplary embodiment, the thermal gel includes a polyether polyol, a cross-linker, a coupling agent, an antioxidant, a catalyst, and at least one thermally conductive filler.

1. Polyether Polyol

The thermal gel includes one or more polyether polyols. The polyether polyols function to form a polymer matrix. The polyether polyols include at least one hydroxide (—OH) group in the polymer chain. The hydroxide groups provide crosslinking points between the polyols. In one embodiment, the polyether polyols comprise a bi-ol or a tri-ol which include two and three hydroxide groups in the polymer chain, respectively.

The hydroxide groups also inversely affect the flowability of the formulations. For example, if the hydroxyl group content of the polyols is too high, the final flowability of the formulation may be limited due to the high extent of resulting crosslinking. In addition, the molecular weight of the polyether polyols also affects the flow properties of the thermal gel. Polyether polyols with substantially high molecular weights reduce the final flowability of formulation while polyether polyols with substantially low molecular weights are unable to provide a stable matrix frame for filler loading.

Exemplary polyether polyols include 330N available from Sinopec Shanghai Gaogia Petrochemical Co., Ltd. or GEP 828 available from Sinopec Shanghai Gaogia Petrochemical Co., Ltd. Other exemplary polyether polyols include: NJ-360N available from JURONG NINGWU Material Company Limited, GY-7500E available from KUKDO Chemical (KunShan) Co., LTD, SD-75 available from Shanghai Dongda Chemistry, SD-820 available from Shanghai Dongda Chemistry, SD-3000L available from Shanghai Dongda Chemistry, SD-7502 available from Shanghai Dongda Chemistry, and SD-8003 available from Shanghai Dongda Chemistry.

In one exemplary embodiment, a polyether polyol is prepared by the polymerization of glycerine with propylene oxide and ethylene oxide in the presence of a base catalyst according to the following equation, followed by fine purification.

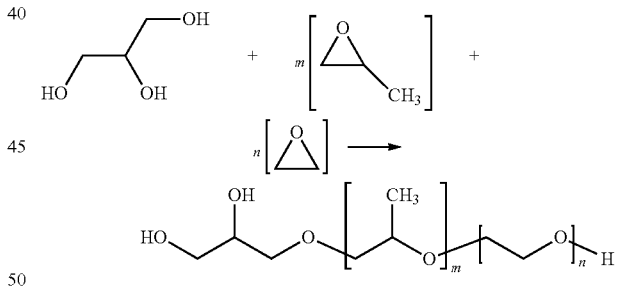

The polyether polyol has the following formula shown below where the values of m and n are dependent on the amount and ratio of propylene epoxide to ethylene oxide as set forth by the reaction conditions. In an embodiment, the values of m and n may each be 1 or greater.

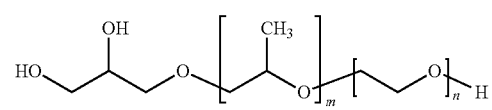

In some exemplary embodiments, the thermal gel includes one or more polyether polyols in an amount as little as 1 wt. %, 3 wt. %, 5 wt. %, 7 wt. %, as great as 10 wt. %, 14 wt. %, 18 wt. %, 20 wt. % or within any range defined between any two of the foregoing values, such as 1 wt. % to 10 wt. %, 5 wt. % to 10 wt. %, or 1 wt. % to 20 wt. % for example, based on the total weight of the thermal gel.

In some exemplary embodiments, the thermal gel includes one or more polyether polyols having a weight average molecular weight (as measured by Gel Permeation Chromatography (GPC)) of as little as 200 Daltons, 400 Daltons, 600 Daltons, 800 Daltons, as great as 1000 Daltons, 5000 Daltons, 10000 Daltons, 20000 Daltons, or within any range defined between any two of the foregoing values, such as 200 Daltons to 20000 Daltons, or 400 Daltons to 10000 Daltons, for example.

2. Coupling Agent

In an exemplary embodiment, the thermal gel includes one or more coupling agents that function to interact with both the thermally conductive filler(s) and the polymer matrix to promote a strong bond at the interface, which helps to break filler particle aggregates and disperse the filler particles into the polymer matrix. In addition, the one or more coupling agents create better adhesion of thermally conductive filler(s) to the polyol polymer matrix.

Exemplary coupling agents include silane coupling agents and organometallic compounds, such as include titanate coupling agents and zirconate coupling agents. Exemplary silane coupling agents include silane coupling agents with an aliphatic group. Exemplary coupling agents include titanium IV 2,2 (bis 2-propenolatomethyl)butanolato, tris(dioctyl)pyrophosphato-O; titanium IV 2-propanolato, tris(dioctyl)-pyrophosphato-O) adduct with 1 mole of diisooctyl phosphite; titanium IV bis(dioctyl)pyrophosphato-O, oxoethylenediolato, (Adduct), bis(dioctyl) (hydrogen)phosphite-O; titanium IV bis(dioctyl)pyrophosphato-O, ethylenediolato (adduct), bis(dioctyl)hydrogen phosphite; zirconium IV 2,2 (bis 2-propenolatomethyl)butanolato, tris (diisooctyl)pyrophosphato-O; zirconium IV 2,2-bis(2-propenolatomethyl) butanolato, cyclo di[2,2-(bis 2-propenolatomethyl) butanolato], pyrophosphato-O,O, and hexadecyltrimethoxysilane. In another exemplary embodiment, the coupling agent is KR-TTS available from Kenrich Chemical Company.

In one exemplary embodiment, the coupling agent is titanium IV 2-propanolato, tris isooctadecanoato, having the following structure shown below (e.g., Kenrich TTS).

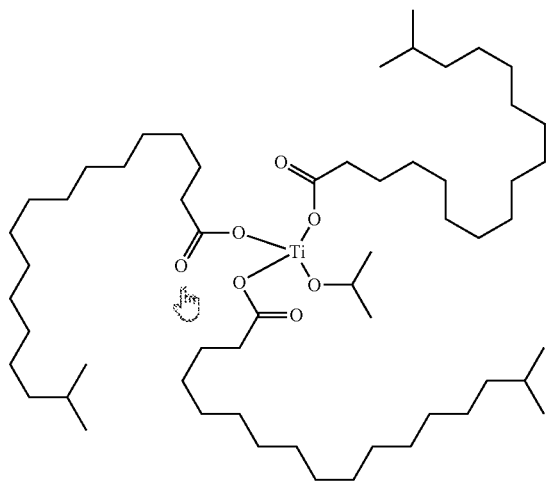

In some exemplary embodiments, the thermal gel includes one or more coupling agents in an amount as little as 0.01 wt. %, 0.1 wt. %, 1.0 wt. %, as great as 2.0 wt. %, 3.0 wt. %, 4.0 wt. %, 5.0 wt. %, or within any range defined between any two of the foregoing values, such as 0.1 wt. % to 5 wt. % or 0.1 wt. % to 1 wt. %, for example, based on the total weight of the thermal gel.

3. Crosslinker

In exemplary embodiments, the thermal gel includes a crosslinker to enable crosslinking between polyols—e.g., the crosslinker reacts with the hydroxy groups of the polyol ether molecules. An exemplary crosslinker includes alkylated melamine formaldehyde resin. Other exemplary crosslinkers include Cymel crosslinkers available from Allnex, for example, Cymel 1158, Cymel 303LF, Cymel 370, Cymel 1156, Cymel 683, and CYMEL MI-97-IX.

In one exemplary embodiment, the crosslinker is a butylated melamine-formaldehyde with a medium to high degree of alkylation, a low to medium methylol content, and a medium to high amino functionality (e.g., Cymel 1158). In a further exemplary embodiment, the crosslinker has the following structure shown below.

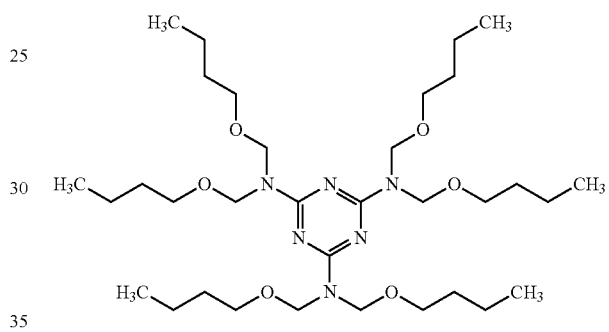

In some exemplary embodiments, the thermal gel includes the one or more crosslinkers in an amount as little as 0.1%, 0.50 wt. %, 0.75 wt. %, 1 wt. %, as great as 2 wt. %, 3 wt. %, 5 wt. %, 10 wt. %, or within any range defined between any two of the foregoing values, such as 0.5 wt. % to 2 wt. % or 0.75 wt. % to 2 wt. %, for example, based on the total weight of the thermal gel.

4. Antioxidant

In some exemplary embodiments, the thermal gel comprises one or more antioxidants that function to terminate oxidation reactions and reduce the degradation of organic compounds (e.g., polymers reacting with atmospheric oxygen directly to produce free radicals). The antioxidant absorbs free radicals to inhibit free-radical induced degradation. Exemplary antioxidants include phenol type, amine type antioxidants, or any other suitable type of antioxidant, or a combination thereof. The phenol or amine type antioxidant may also be a sterically hindered phenol or amine type antioxidant. Exemplary phenol type antioxidants include octadecyl 3-(3,5-di-(tert)-butyl-4-hydroxyphenyl) propionate. Exemplary amine type antioxidants include 2,6-di-tert-butyl-4-(4,6-bis(octylthio)-1,3,5-triazin-2-ylamino) phenol. Exemplary sterically hindered antioxidants include sterically hindered sulfur containing phenolic antioxidants. Exemplary antioxidants include the Irganox antioxidants available from BASF, such as Irganox 1135, Irganox 5057. Another exemplary antioxidant may include IRGASTAB PUR68.

In one exemplary embodiment, the antioxidant is a mixture of Octyl-3,5-di-tert-butyl-4-hydroxy-hydrocinnamate (Formula A shown below) and 2(3H)-Benzofuranone, 3-[2-

(acetyloxy)-5-(1,1,3,3-tetramethylbutyl)phenyl]-5-(1,1,3,3-tetramethylbutyl)-(Formula B shown below) (e.g., PUR 68).

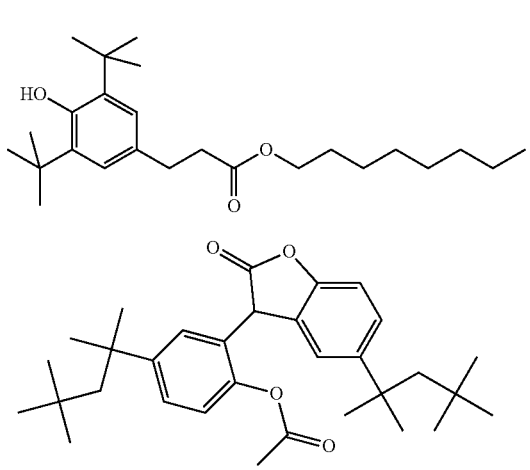

In some exemplary embodiments, the thermal gel includes the one or more antioxidants in an amount as little as 0.1 wt. %, 0.2 wt. %, 0.4 wt. %, as great as 0.6 wt. %, 0.8 wt. %, 1 wt. %, or within any range defined between any two of the foregoing values, such as 0.2 wt. % to 0.4 wt. %, or 0.1 wt. % to 1 wt. %, for example, based on the total weight of the thermal gel.

5. Catalyst

The thermal gel further includes one or more catalysts to catalyze the crosslinking of the polyol and the crosslinker resin. Exemplary catalysts include thermal acid generators, such as sulfonic acid group containing materials. Exemplary free acids of sulfonic acid groups containing catalysts may have the general formula shown below:

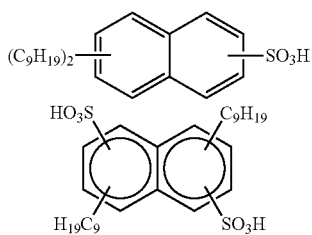

Exemplary sulfonic acid group containing catalysts include amine blocked compounds, such as: amine neutralized benzene sulfonic acid, amine neutralized dinonylnaphthalene disulfonic acid or amine neutralized dinonylnaphthalenesulfonic acid. Other exemplary catalysts include: NACURE X49-110, NACURE 2107, NACURE 2500, NACURE 2501, NACURE 2522, NACURE 2530, NACURE 2558, NACURE XL-8224, NACURE 4167, NACURE XP-297, from the King Industry.

Without wishing to be held to any particular theory, it is believed that the catalysts provide favorable package stability and cure response characteristics of the resultant thermal gel. Free acids from the catalysts provide faster cure and a lower curing temperature, and the amine blocked compounds maintain stability of the formulation and provide for a longer shelf-life and, in some cases, a longer pot life.

In one exemplary embodiment, the catalyst is dinonylnaphthalenedisulfonic acid, and releases acid when heated, for example heated under 80° C. and has the following structure shown below (e.g., N-X49-110).

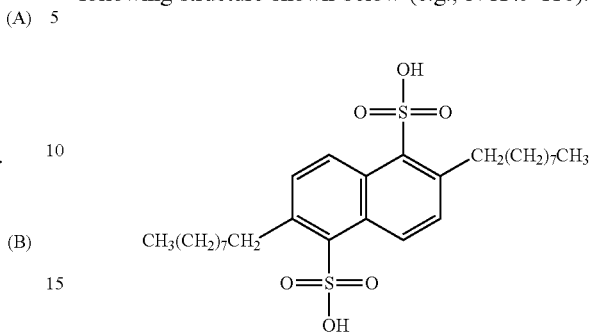

The thermal gel may include a catalyst in an amount as little as 0.1 wt. %, 0.2 wt. %, 0.3 wt. %, as great as 0.6 wt. %, 0.8 wt. %, 1 wt. %, or within any range defined between any two of the foregoing values, such as between 0.2 wt. % to 0.8 wt. % or between 0.3 wt. % to 0.6 wt. %, based on the total weight of the thermal gel. In one exemplary embodiment, the thermal gel includes a catalyst in the amount of about 0.373 wt. %.

6. Thermally Conductive Filler

The thermal gel includes one or more thermally conductive fillers. Exemplary thermally conductive fillers include metals, alloys, nonmetals, metal oxides and ceramics, and combinations thereof. The metals include, but are not limited to, aluminum, copper, silver, zinc, nickel, tin, indium, and lead. The nonmetals include, but are not limited to, carbon, graphite, carbon nanotubes, carbon fibers, graphenes, boron nitride and silicon nitride. The metal oxides or ceramics include but not limited to alumina (aluminum oxide), aluminum nitride, boron nitride, zinc oxide, and tin oxide.

In one exemplary embodiment, the one or more thermally conductive fillers include alumina (Al2O3) with a 40 micron (mm) average particle size (D50) (e.g., BAK040), alumina (Al2O3) with a 5 micron (mm) average particle size (D50) (e.g., BAK005), and alumina ($Al_2O_3$) with a 5 micron (mm) average particle size (D50) (e.g., AO-502).

The thermal gel may include the one or more thermally conductive fillers in an amount as little as 15 wt. %, 20 wt. %, 25 wt. %, 50 wt. %, 85 wt. %, 90 wt. %, as great as 92 wt. %, 95 wt. %, 98 wt. %, 99 wt. % or within any range defined between any two of the foregoing values, based on the total weight of the thermal gel, such as 15 wt. % to 50 wt. %, 20 wt. % to 50 wt. %, or 15 wt. % to 99 wt. %, 80 wt. % to 99 wt. %, 80 wt. % to 98 wt. %, 85 wt. % to 95 wt. %, or 90 wt. % to 92 wt. %, for example.

Exemplary thermally conductive fillers may have an average particle size of as little as 0.1 microns, 1 micron, 10 microns, as great as 25 microns, 40 microns, 50 microns, or within any range defined between any two of the foregoing values, such as 0.1 microns to 50 microns, 1 micron to 40 microns, or 10 microns to 25 microns, for example.

In one exemplary embodiment, the thermal gel may include a first thermally conductive filler, a second thermally conductive filler, and a third thermally conductive filler, wherein the first thermally conductive filler has a particle size of 40 microns, the second thermally conductive filler has an average particle size of 5 microns, and the third thermally conductive filler has an average particle size of 0.5 microns.

In one exemplary embodiment, the thermal gel includes a first thermally conductive filler in the amount of as little as 30 wt. %, 35 wt. %, 40 wt. %, as great as 45 wt. %, 50 wt. %, 60 wt. % or within any range defined between any two of the foregoing values such as between 30 wt. % to 60 wt. %, 35 wt. % to 50 wt. %, or 40 wt. % to 50 wt. %, for example, based on the total weight of the thermal gel. The first thermally conductive filler may have an average particle size of as little as 30 microns. 35 microns, 40 microns, as great as 45 microns, 50 microns, 60 microns, or within any range defined between any two of the foregoing values such as between 30 microns to 60 microns, 35 microns to 50 microns, or 40 microns to 45 microns, for example. The exemplary thermal gel further may include a second thermally conductive filler in the amount of as little as 5 wt. %, 10 wt. %, 15 wt. %, as great as 25 wt. %, 27 wt. %, 30 wt. % or within any range defined between any two of the foregoing values such as between 5 wt. % to 30 wt. %, 10 wt. % to 27 wt. %, or 15 wt. % to 25 wt. %, for example, based on the total weight of the thermal gel. The second thermally conductive filler may have an average particle size of as little as 1 micron, 3, microns, 5 microns, as great as 7 microns, 8 microns, 10 microns, or within any range defined between any two of the foregoing values such as between 1 micron to 10 microns, 3 microns to 8 microns, or 5 microns to 7 microns, for example. The exemplary thermal gel further may include a third thermally conductive filler in the amount of as little as 10 wt. %, 15 wt. %, 20 wt. %, as great as 30 wt. %, 35 wt. %, 40 wt. % or within any range defined between any two of the foregoing values such as between 10 wt. % to 40 wt. %, 15 wt. % to 35 wt. %, or 20 wt. % to 30 wt. %, for example, based on the total weight of the thermal gel. The third thermally conductive filler may have an average particle size of as little as 0.1 microns, 0.3, microns. 0.5 microns, as great as 1 micron, 1.5 microns, 2 microns, or within any range defined between any two of the foregoing values such as between 0.1 microns to 2 microns, 0.3 microns to 1.5 microns, or 0.5 microns to 1 micron, for example.

7. Other Additives

The thermal gel may also include a coloring agent or other additives. Exemplary organic pigments include: benzimidazolone, such as the blue shade benzimidazolone pigment Novoperm Carmine HF3C from Clariant International Ltd, Muttenz Switzerland. Exemplary inorganic pigments include carbon black and iron based compounds (e.g., iron green or iron oxide green). Exemplary iron based compounds include iron oxide compounds such as $\alpha$-$Fe_2O_3$, $\alpha$-$Fe_2O_3 \cdot H_2O$, $Fe_3O_4$, $Fe_2O_3 \cdot H_2O$, and combinations thereof. Exemplary organic dyes include: Benzo[kl]thioxanthene-3,4-dicarboximide,N-octadecyl-(8Cl); Benzothioxanthene-3,4-dicarboxylic acid-N-stearylimide.

In some exemplary embodiments, the coloring agent is an inorganic pigment selected from the group consisting of $\alpha$-$Fe_2O_3$; $\alpha$-$Fe_2O_3 \cdot H_2O$; $Fe_2O_3 \cdot H_2O$; and $Fe_3O_4$.

In some exemplary embodiments, the coloring agent is an organic pigment. In a more particular embodiment, the coloring agent is an organic selected from the group consisting of Formulas (I)-(XVI).

In a more particular embodiment, the coloring agent is an organic pigment of Formula (I), also known as pigment red 176, and having CAS No. 12225-06-8.

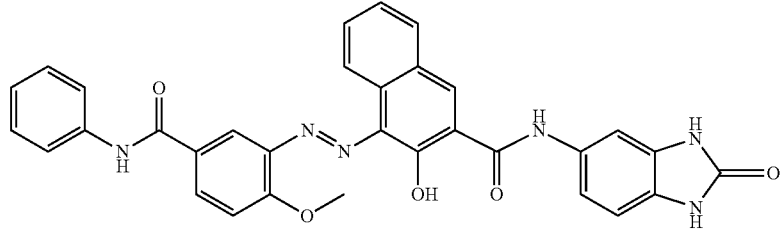

Formula (I)

In a more particular embodiment, the coloring agent is an organic pigment of Formula (II), also known as calcium bis[4-[[1-[[(2-methylphenyl)amino]carbonyl]-2-oxopropyl] azo]-3-nitrobenzenesulphonate, and having CAS No. 12286-66-7.

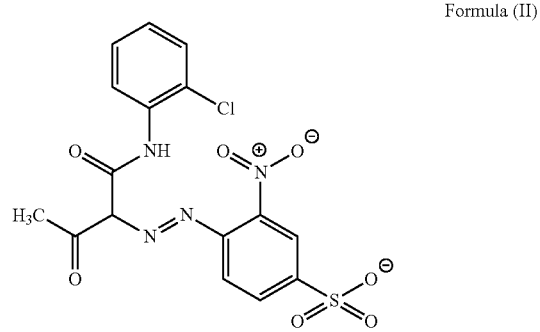

Formula (II)

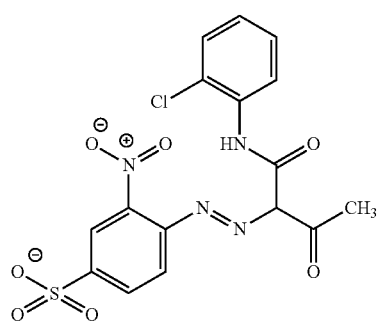

In a more particular embodiment, the coloring agent is an organic pigment of Formula (III) also known as diethyl 4,4'-[(3,3'-dichloro[1,1'-biphenyl]-4,4'-diyl)bis(azo)]bis[4, 5-dihydro-5-oxo-1-phenyl-1h-pyrazole-3-carboxylate], and having CAS No. 6358-87-8.

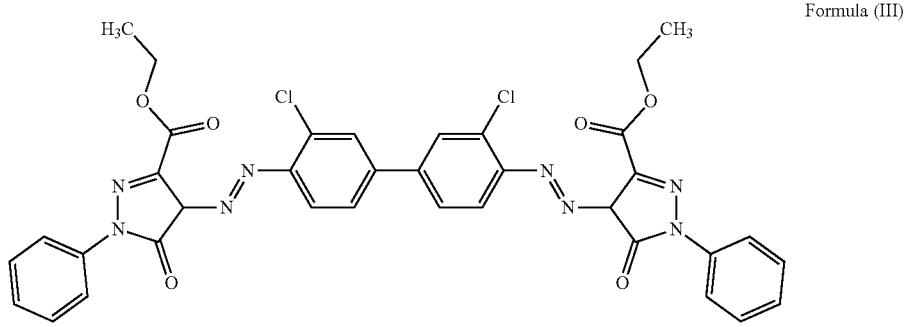 [SMILES: CCOC(=O)C1=NN(c2ccccc2)C(=O)C1/N=N/c1ccc(-c2ccc(/N=N/C3C(=O)N(c4ccccc4)N=C3C(=O)OCC)c(Cl)c2)cc1Cl]

Formula (III)

In a more particular embodiment, the coloring agent is an organic pigment of Formula (IV) also known as 2,2'-[(3,3'-Dichloro[1,1¹-biphenyl]-4,4'-diyl)bis(azo)]bis[N-(2,4-dimethylphenyl)-3-oxo-butanamide, and having CAS No. 5102-83-0.

Formula (IV)

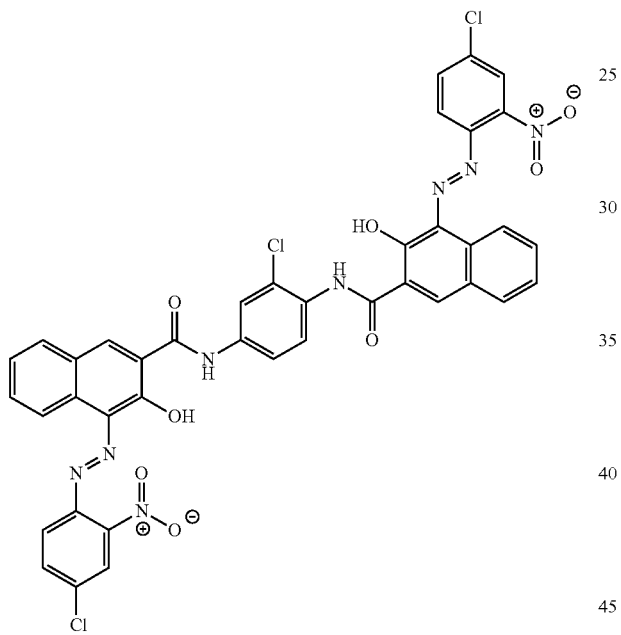

In a more particular embodiment, the coloring agent is an organic pigment of Formula (V) also known as (29H,31H-phthalocyaninato(2-)-N29,N30,N31,N32)copper, and having CAS No. 147-14-8.

Formula (V)

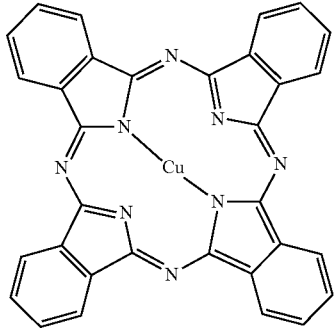

In a more particular embodiment, the coloring agent is an organic pigment of Formula (VI) also known as brilliant-greenphthalocyanine, and having CAS No. 1328-53-6.

Formula (VI)

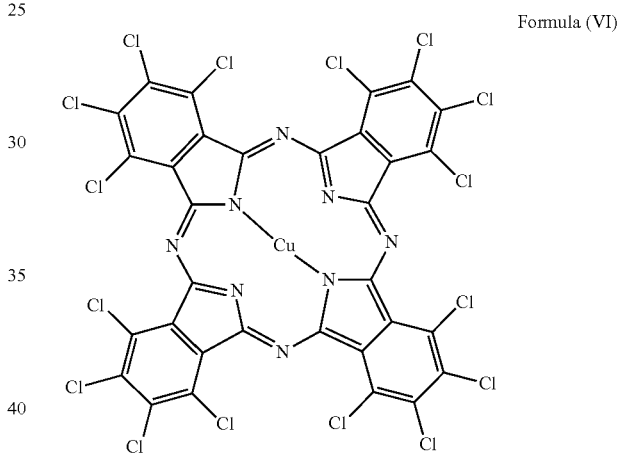

In a more particular embodiment, the coloring agent is an organic pigment of Formula (VII) also known as 9,19-dichloro-5,15-diethyl-5,15-dihydro-diindolo[2,3-c:2',3'-n]triphenodioxazine, and having CAS No. 6358-30-1.

Formula (VII)

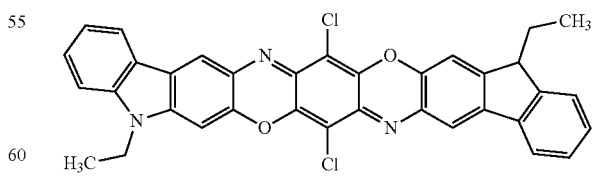

In a more particular embodiment, the coloring agent is an organic pigment of Formula (VIII) also known as 5,12-DIHYDROQUIN[2,3-B]ACRIDINE-7,14-DIONE;5,12-dihydroquino[2,3-b]acridine-7,14-dione, and having CAS No. 1047-16-1.

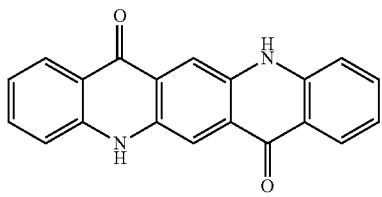

Formula (VIII)

In a more particular embodiment, the coloring agent is an organic pigment of Formula (IX) also known as 2,9-bis(3,5-dimethylphenyl)anthra[2,1,9-def:6,5,10-d'e'f']diisoquinoline-1,3,8,10(2h,9h)-tetrone, and having CAS No. 4948-15-6.

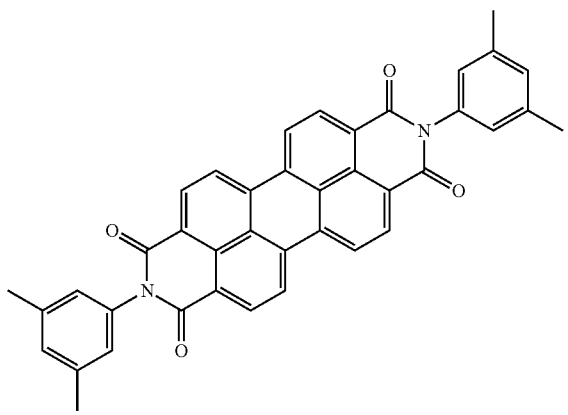

Formula (IX)

In a more particular embodiment, the coloring agent is an organic pigment of Formula (X) also known as 4,4'-diamino-[1,1-bianthracene]-9,9',10,10'-tetraone or pigment red 177, and having CAS No. 4051-63-2.

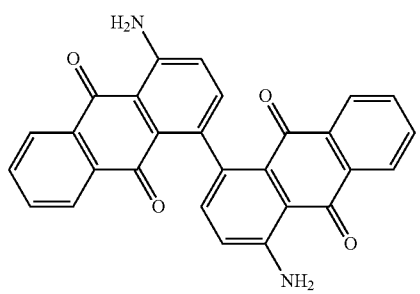

Formula (X)

In a more particular embodiment, the coloring agent is an organic pigment of Formula (XI) also known as 3,3'-[(2-methyl-1,3-phenylene)diimino]bis[4,5,6,7-tetrachloro-1H-isoindol-1-one], and having CAS No. 5045-40-9.

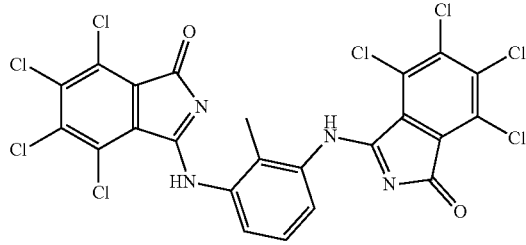

Formula (XI)

In a more particular embodiment, the coloring agent is an organic pigment of Formula (XII) also known as calcium bis[4-[[1-[[(2-chlorophenyl)amino]carbonyl]-2-oxopropyl]azo]-3-nitrobenzenesulphonate], and having CAS No. 71832-85-4.

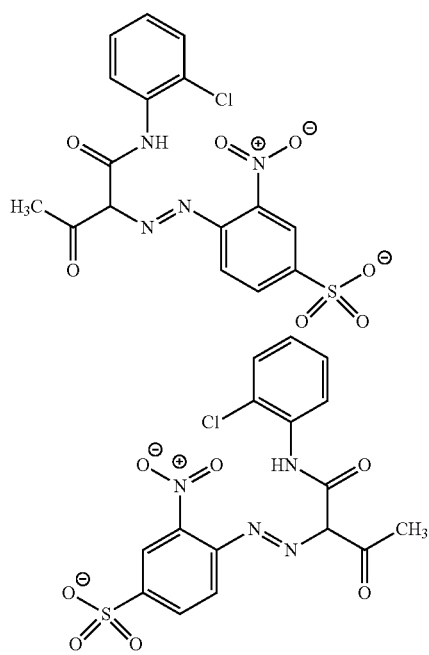

Formula (XII)

In a more particular embodiment, the coloring agent is an organic pigment of Formula (XIII) also known as 3,4,5,6-Tetrachloro-N-[2-(4,5,6,7-tetrachloro-2,3-dihydro-1,3-dioxo-1H-inden-2-yl)-8-quinolyl]phthalimide, and having CAS No. 30125-47-4.

Formula (XIII)

In a more particular embodiment, the coloring agent is an organic pigment of Formula (XIV) also known as [1,3-dihydro-5,6-bis[[(2-hydroxy-1-naphthyl)methylene]amino]-2H-benzimidazol-2-onato(2-)-N5,N6,O5,O6]nickel, and having CAS No. 42844-93-9.

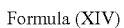

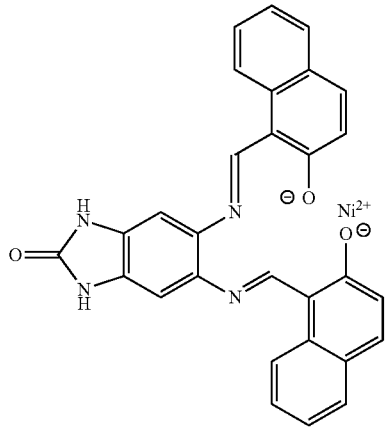

In a more particular embodiment, the coloring agent is an organic pigment of Formula (XV) also known as Pigment Red 279, and having CAS No. 832743-59-6, wherein each R is independently selected from the group consisting of hydrogen, alkyl, aryl, and halogen. In an even more particular embodiment, each R is independently selected from the group consisting of hydrogen, $C_1$-$C_6$ alkyl, phenyl, and halogen. In another more particular embodiment, each R is chlorine, and even more particularly, each R is 7-chloro.

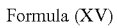

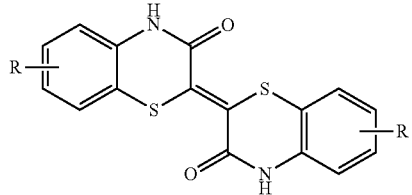

In a more particular embodiment, the coloring agent is an organic pigment of Formula (XVI) also known as Pyrimido[5,4-g]pteridine-2,4,6,8-tetramine, 4-methylbenzenesulfonate, base-hydrolysed, and having CAS No. 346709-25-9.

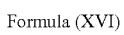

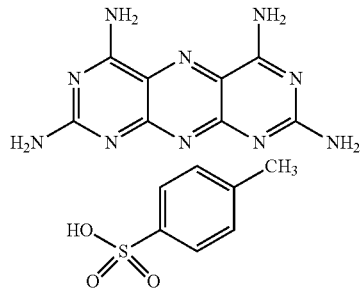

In one more particular embodiment, the coloring agent is $\alpha$-$Fe_2O_3$, such as such as Iron Red available from BAI YAN. In another more particular embodiment, the coloring agent is $\alpha$-$Fe_2O_3 \cdot H_2O$, such as such as Iron Yellow available from BAI YAN. In still another more particular embodiment, the coloring agent is $Fe_3O_4$, such as such as Iron Blue available from BAI YAN. In yet still another more particular embodiment, the coloring agent is the pigment of Formula (I), having the chemical formula $C_{32}H_{24}N_6O_5$, such as Novoperm Carmine HF3C, available from Clariant International Ltd, Muttenz Switzerland.

In another embodiment, the additive may be an iron green pigment.

The present thermal gel may further comprise some other additives, such as pigments or dyes. In one embodiment, the thermal gel includes pigment components in an amount as little as 0.001 wt. %, 0.01 wt. %, 0.05 wt. %, 0.08 wt. %, as great as 2 wt. %, 5 wt. %, 10 wt. % or within any range defined between any two of the foregoing values such as between 0.001 wt. % to 10 wt. %, 0.05 wt. % to 2 wt. %, or 0.08 wt. % to 5 wt. %, for example, based on the total weight of the thermal gel.

In one exemplary embodiment, the thermal gel may include a first thermally conductive filler in an amount as little as 30 wt. %, 35 wt. %, or 40 wt. %, as great as 50 wt. %, 55 wt. %, or 60 wt. %, or within any range defined between any two of the foregoing values such as between 30 wt. % to 60 wt. %, 35 wt. % to 55 wt. %, or 40 wt. % to 50 wt. %, for example, based on the total weight of the thermal gel. The first thermally conductive filler may have an average particle size of as little as 30 microns, 35 microns, or 40 microns, or as great as 45 microns, 50 microns, or 60 microns, or within any range defined between any two of the foregoing values such as between 30 microns to 60 microns, 35 microns to 50 microns, 40 microns to 45 microns, or 35 microns to 45 microns, for example. The exemplary thermal gel may further include a second thermally conductive filler in an amount as little as 5 wt. %, 10 wt. %, or 15 wt. %, or as great as 25 wt. %, 27 wt. %, or 30 wt. % or within any range defined between any two of the foregoing values such as between 5 wt. % to 30 wt. %, 10 wt. % to 27 wt. %, or 15 wt. % to 25 wt. %, for example, based on the total weight of the thermal gel. The second thermally conductive filler may have an average particle size of as little as 1 micron, 3 microns, or 5 microns, or as great as 10 microns, 15 microns, or 20 microns, or within any range defined between any two of the foregoing values such as between 1 micron to 20 microns, 3 microns to 15 microns, or 5 microns to 10 microns, for example. The exemplary thermal gel may further include a third thermally conductive filler in an amount as little as 5 wt. %, 10 wt. %, or 15 wt. %, or as great as 25 wt. %, 27 wt. %, or 30 wt. % or within any range defined between any two of the foregoing values such as between 5 wt. % to 30 wt. %, 10 wt. % to 27 wt. %, or 15 wt. % to 25 wt. %, for example, based on the total weight of the thermal gel. The third thermally conductive filler may have an average particle size of as little as 0.1 microns, 0.3 microns, or 0.5 microns, or as great as 1 micron, 1.5 microns, or 2 microns, or within any range defined between any two of the foregoing values such as between 0.1 microns to 2 microns, 0.3 microns to 1.5 microns, or 0.5 microns to 1 microns, for example. The exemplary thermal gel may further include a polyether polyol in an amount as little as 1 wt. %, 3 wt. %, 5 wt. %, 7 wt. %, as great as 10 wt. %, 14 wt. %, 18 wt. %, 20 wt. % or within any range defined between any two of the foregoing values, such as 1 wt. % to 10 wt. %, 5 wt. % to 10 wt. %, or 1 wt. % to 20 wt. % for example, based on the total weight of the thermal gel. The exemplary thermal gel may further include a crosslinker in an amount as little as 0.1%, 0.50 wt. %, 0.75 wt. %, 1 wt. %, as great as 2 wt. %, 3 wt. %, 5 wt. %, 10 wt. %, or within any range defined between any two of the foregoing values, such as 0.5 wt. % to 2 wt. % or 0.75 wt. % to 2 wt. %, for example, based on the total weight of the thermal gel. The exemplary thermal gel may further include a coupling agent in an amount as little as 0.01 wt. %, 0.1 wt. %, 1.0 wt. %, as great as 2.0 wt. %, 3.0 wt. %, 4.0 wt. %, 5.0 wt. %, or within any range defined between any two of the foregoing values, such as 0.1 wt. % to 5 wt. % or 0.1 wt. % to 1 wt. %, for example, based on the total weight of the thermal gel. The exemplary thermal gel may further include an antioxidant in an amount as little as 0.1 wt. %, 0.2 wt. %, 0.4 wt. %, as great as 0.6 wt. %, 0.8 wt. %, 1 wt. %, or within any range defined between any two of the foregoing values, such as 0.2 wt. % to 0.4 wt. %, or 0.1 wt. % to 1 wt. %, for example, based on the total weight of the thermal gel. The exemplary thermal gel may further include a catalyst in an amount as little as 0.1 wt. %, 0.2 wt. %, 0.3 wt. %, as great as 0.6 wt %, 0.8 wt. %, 1 wt. %, or within any range defined between any two of the foregoing values, such as between 0.2 wt. % to 0.8 wt. % or between 0.3 wt. % to 0.6 wt. %, based on the total weight of the thermal gel. The exemplary thermal gel may further include an additive (e.g., a pigment) in an amount as little as 0.001 wt. %, 0.01 wt. %, 0.05 wt. %, 0.08 wt. %, as great as 2 wt. %, 5 wt. %, 10 wt. % or within any range defined between any two of the foregoing values such as between 0.001 wt. % to 10 wt. %, 0.05 wt. % to 2 wt. %, or 0.08 wt. % to 5 wt. %, for example, based on the total weight of the thermal gel.

The present thermal gel may lack any silicone containing components. Silicone containing components include polymerized siloxanes or polysiloxanes, and silicone containing oligomers or polymers that include an inorganic silicon-oxygen backbone chain with functional groups (e.g., organic side groups) attached to the silicon atoms. In one embodiment, the thermal gel includes silicone containing components in an amount of less than 1 wt. %, less than 0.5 wt. %, less than 0.3 wt. %, or less than 0.1 wt. %, for example, based on the total weight of the thermal gel.

The present thermal gel may also lack any silicon atoms. In one embodiment, the thermal gel includes silicon atoms in an amount of less than 1 wt. %, less than 0.5 wt. %, less than 0.3 wt. %, or less than 0.1 wt. %, or less than 0.01 wt. %, for example, based on the total weight of the thermal gel.

B. Method of Forming a Thermal Gel

1. Batch Method

Referring to FIG. 1, a method 100 of preparing a thermal gel is shown. At block 102, a polyether polyol, coupling agent, antioxidant, and cross-linker are weighed and added to a reaction vessel to form a mixture. The mixture is agitated for a period of time. Exemplary agitation rates may be as little as 2000 revolutions per minute (rpm), 2500 rpm, 3000 rpm, as great as 3250 rpm, 3350 rpm, 3500 rpm or within any range defined between any two of the foregoing values such as between 2000 rpm to 3500 rpm, 2500 rpm to 3350 rpm, or 3000 rpm to 3250 rpm, for example. Exemplary time periods for agitation rates are as little as 20 seconds, 25 seconds, 30 seconds, as great as 200 seconds, 250 seconds, 275 seconds, 300 seconds or within any range defined between two of the foregoing values such as between 20 seconds to 300 seconds, 25 seconds to 275 seconds, 30 seconds to 250 seconds, or 30 seconds to 200 seconds, for example. In an exemplary embodiment, the mixture is agitated at a rate of under 3000 rpm for 3 minutes.

Method 100 then proceeds to block 104 where one or more thermally conductive fillers are added to the reaction vessel. The resulting mixture is then agitated for a period of time. Exemplary agitation rates may be as little as under 2000 revolutions per minute (rpm), 2250 rpm, 2500 rpm, as great as 2600 rpm, 2750 rpm, 3000 rpm or within any range defined between any two of the foregoing values such as between 2000 rpm to 3000 rpm, 2250 rpm to 2750 rpm, or 2500 rpm to 2600 rpm, for example. Exemplary time periods for agitation rates are as little as 1 minute, 2 minutes, 3 minutes, as great as 4 minutes, 4.5 minutes, 5 minutes, or within any range defined between two of the foregoing values such as between 1 minute to 5 minutes, 2 minutes to 4.5 minutes, or 3 minutes to 4 minutes, for example. In an exemplary embodiment, the mixture is agitated at a rate of under 2500 rpm for 3 minutes.

Method 100 then proceeds to block 106 where the mixture is cooled to room temperature. Method 100 then moves to block 108 where a catalyst is weighed and added to the reaction vessel. The resulting mixture is then agitated for a period time. Exemplary agitation rates may be as little as under 2000 revolutions per minute (rpm), 2250 rpm, 2500 rpm, as great as 2600 rpm, 2750 rpm, 3000 rpm or within any range defined between any two of the foregoing values such as between 2000 rpm to 3000 rpm, 2250 rpm to 2750 rpm, or 2500 rpm to 2600 rpm, for example. Exemplary time periods for agitation rates are as little as 1 minute, 2 minutes, 3 minutes, as great as 4 minutes, 4.5 minutes, 5 minutes, or within any range defined between two of the foregoing values such as between 1 minute to 5 minutes, 2 minutes to 4.5 minutes, or 3 minutes to 4 minutes, for example. In an exemplary embodiment, the mixture is agitated at a rate of under 2500 rpm for 3 minutes. A vacuum is then applied to the reaction mixture when the mixture is in a uniform phase. The vacuum is accompanied with low rotating speed that may be as little as 1000 rpm, 1250 rpm, 1500 rpm, as great as 1600 rpm, 1750 rpm, 2000 rpm, or within any range defined between any two of the foregoing values such as between 1000 rpm to 2000 rpm, 1250 rpm to 1750 rpm, or 1500 rpm to 1600 rpm, for example.

Then, method 100 proceeds to block 110 where the mixture is cooled to room temperature. After cooling, method 100 proceeds to block 112, and the vacuum is opened/removed within the vessel and the mixture is agitated for a period of time. Exemplary agitation rates may be as little as under 2000 revolutions per minute (rpm), 2250 rpm, 2500 rpm, as great as 2600 rpm, 2750 rpm, 3000 rpm or within any range defined between any two of the foregoing values such as between 2000 rpm to 3000 rpm, 2250 rpm to 2750 rpm, or 2500 rpm to 2600 rpm, for example. Exemplary time periods for agitation rates are as little as 1 minute, 2 minutes, 3 minutes, as great as 4 minutes, 4.5 minutes, 5 minutes, or within any range defined between two of the foregoing values such as between 1 minute to 5 minutes, 2 minutes to 4.5 minutes, or 3 minutes to 4 minutes, for example. In an exemplary embodiment, the mixture is agitated at a rate of under 2500 rpm for 3 minutes.

In some exemplary embodiments, the thermal gel is prepared by combining the individual components in a heated mixer and blending the composition together. The blended composition may then be applied directly to the substrate without baking.

2. Two Component Method

Figure 9:
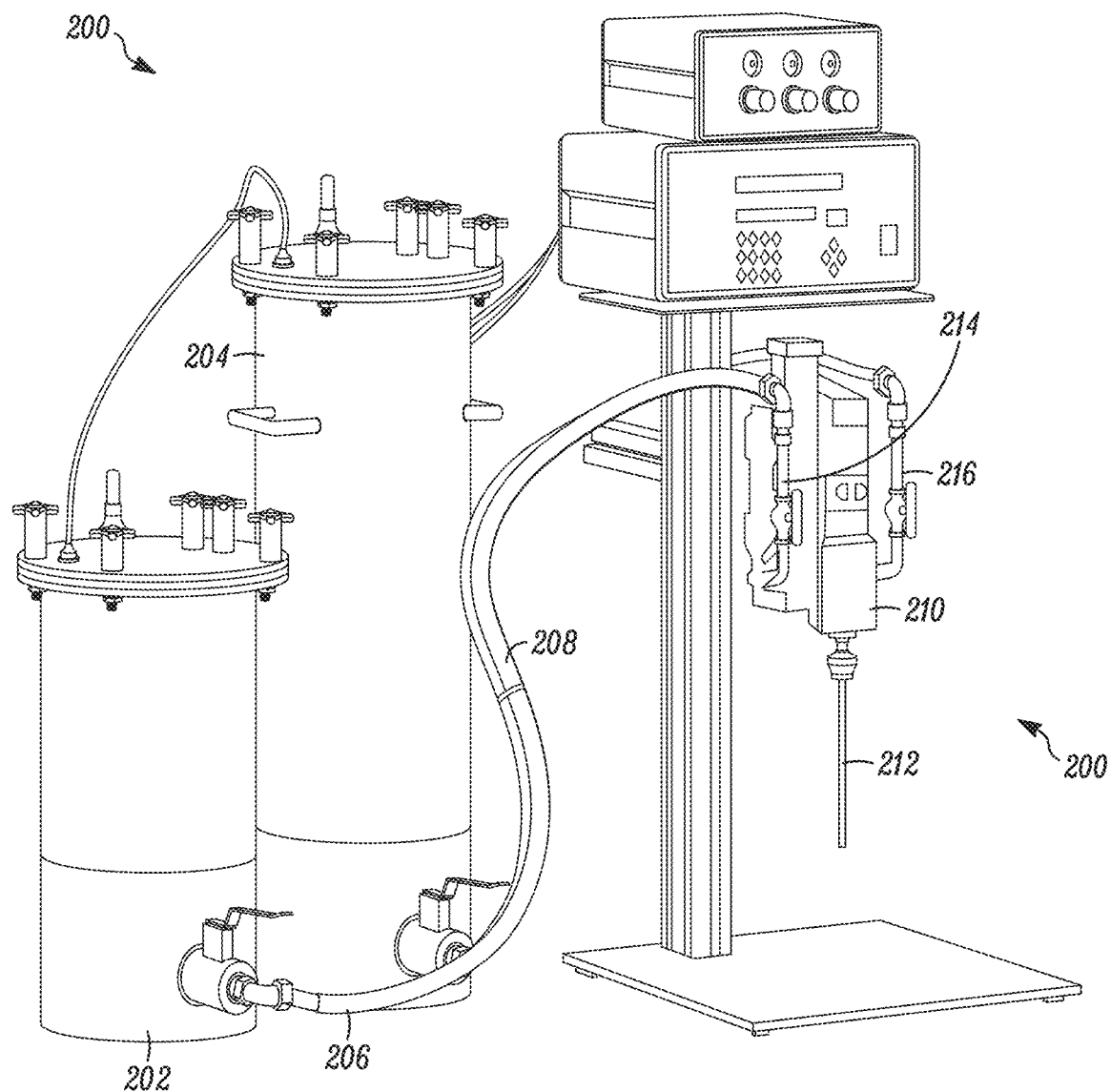
FIG. 9 is a perspective view of a dispenser used with the thermal gel of the present disclosure.

In another exemplary embodiment, the thermal gel is prepared by preparing a first component and a second component and combining the first and second components in a dispenser. For example, a dual cartridge dispenser apparatus 200 as shown in FIG. 9 can be used in which the first component is stored in container 202 and the second component is stored in container 204. The first and second components are fed through respective tubing 206, 208 to cartridges 214, 216, respectively. From cartridge 214, first component is fed into mixing vessel 210 of dispenser 220. Similarly, from cartridge 216, second component is fed into mixing vessel 210 of dispenser 220. First and second components are then mixed within mixing vessel 210 without additional heating, and the resulting mixed composition is fed through syringe 212 of dispenser 220. In one embodiment, the mixed composition may then be applied directly to the substrate.

Figure 8:
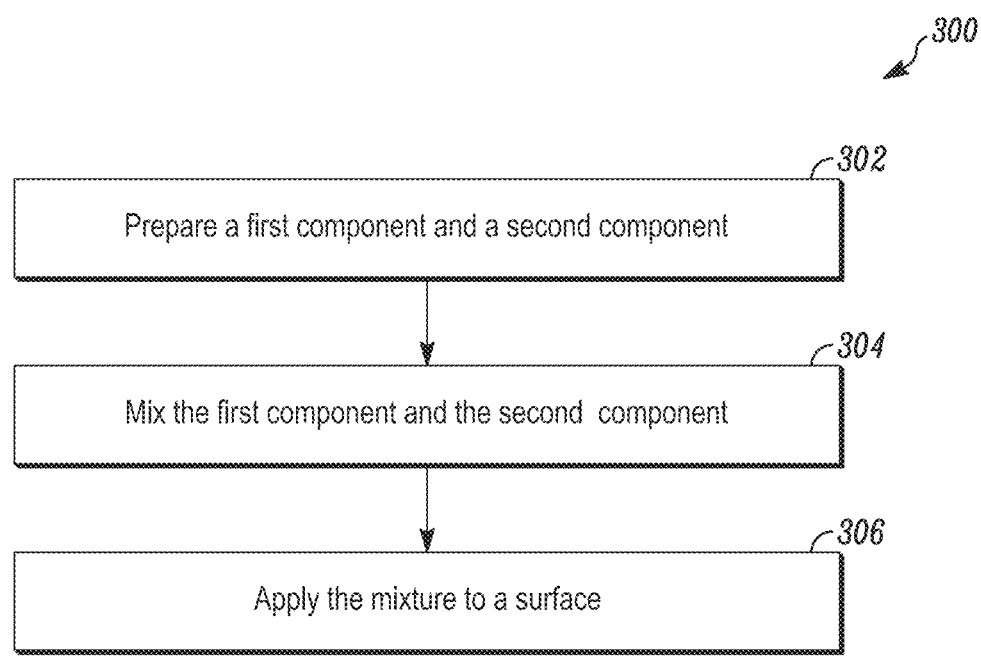
FIG. 8 is a flowchart illustrating a method of preparing the thermal gel in accordance with the present disclosure.

Referring now to FIG. 8, a method 300 for preparing the thermal gel is provided. At step 302, a first component and a second component are prepared in accordance with the components described further herein.

a. First Component

In an exemplary embodiment, the first component of the thermal gel includes a polyether polyol, a catalyst, and at least one thermally conductive filler in accordance with the present description above for the respective components.

b. Second Component

In an exemplary embodiment, the second component of the thermal gel includes a polyether polyol in accordance with the description above. It is within the scope of the present disclosure that the polyether polyol of the first component and the polyether polyol of the second component are different polyether polyol compounds. It is also within the scope of the present disclosure that the polyether polyol of the first component and the polyether polyol of the second component are the same polyether polyol compounds. The second component of the thermal gel further includes a crosslinker, at least one thermally conductive filler, and an additive in accordance with the present description above for the respective components.

Once the components are prepared, method 300 moves to step 304 where the first component and the second component are mixed together in a ratio (first component:second component) of as little 0.1:1, 0.5:1, 1:1, as great as 5:1, 7.5:1, 10:1, or within any range defined between any two of the foregoing values, such as from 0.1:1 to 10:1, for example. Different ratios yield different amounts of crosslinking within the mixture and also different hardness properties. In an exemplary embodiment, the first component and the second component are mixed in a 1:1 ratio by a static mixer.

After the first component and the second component are mixed, the resulting mixture is then applied onto a surface as indicated by step 306. The mixture can be applied by an automatic dispensing machine or a manual dispensing machine such as a syringe.

C. Properties of the Thermal Gel

When the thermal gel is applied to a substrate, minimal leakage is experienced due to the cross-linking within the thermal gel. That is, the crosslinker advantageously crosslinks the polyols such that a substantially limited amount of polymer leakage occurs. Limited leakage reduces the contamination of the surrounding ports (e.g., electrical components).

Generally, cyclic siloxane compounds, such as hexamethylcyclotrisiloxane and octamethylcyclotetrasiloxane, are present in electronic products. If some of these cyclic siloxane compounds are deposited on the electrodes within the electronic products, the cyclic siloxane compounds will undergo ring-opening polymerization under certain conditions and form an insulating polysiloxane layer, which will undermine the proper functionality of the electrodes and in turn ruin the functionality of the electronic products. By contrast, the thermal gel of the present disclosure is silicone free which avoids the aforementioned problems if some of the thermal gel may potentially be deposited onto the electrode.

Furthermore, as will be described in greater detail below, the thermal gel can be cured at a temperature up to 80° C. as measured by thermal cycling under TCB. In TCB, samples are put into an oven and the temperature is controlled (e.g., between −40° C. to 80° C.). The samples undergo thermal cycling for weeks or months after which, the samples are examined to see whether cracks are present in the samples or whether the samples have slid from their original position prior to thermal cycling. Many electronic components operate at a temperature around 80° C. and thus, there is no need for an additional heating step to cure the thermal gel after the gel is applied. Moreover, the gel allows for easy removal if the gel needs to be reapplied or re-worked onto the applied surface. In addition, the thermal conductivity of the thermal gel is as little as 1 W/mK, 2 W/mK, 2.5 W/mK, as great as 4 W/mK, 4 W/mK, 4 W/mK, or within any range defined between any two of the foregoing values such as between 1 W/mK to 5 W/mK, 2 W/mK to 4.5 W/mK, or 2.5 W/mK to 4 W/mK, for example.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Examples 1-3

Thermal gels were prepared according to the formulations shown in Table 1 and the description below.

TABLE 1

| Component | Example 1 (g) | Example 2 (g) | Example 3 (g) |
| --- | --- | --- | --- |
| Polyether Polyol (bi-ol) | 3.53 | 7.06 | 3.53 |
| Polyether polyol (tri-ol) | 3.53 | — | — |
| Polyether polyol (hexa-ol) | — | — | 3.53 |
| Crosslinker | 1.85 | 1.85 | 1.85 |
| Coupling Agent | 0.59 | 0.59 | 0.59 |
| Antioxidant | 0.35 | 0.35 | 0.35 |
| Catalyst | 0.44 | 0.44 | 0.44 |
| Thermally Conductive Filler | 42.28 | 42.28 | 42.28 |
| Thermally Conductive Filler | 21.57 | 21.57 | 21.57 |
| Thermally Conductive Filler | 25.86 | 25.86 | 25.86 |

A polyether polyol, a coupling agent, an antioxidant, and a crosslinker are weighed and added to a plastic cup. The mixture is then stirred with a speedmixer at 3000 revolutions per minute (rpm) for 30 seconds.

The thermally conductive fillers are weighed and added to the plastic cup. The mixture is stirred with a speedmixer under 2500 rpm for 3 minutes and then cooled to room temperature.

A catalyst is weighed and added to the cup. The mixture is stirred with a speedmixer under 2500 rpm for 3 minutes and then cooled to room temperature. The vacuum is then opened and the mixture is stirred with a speedmixer at 2500 rpm for 3 minutes.

The resulting paste is filled into a syringe and then dispensed onto a smooth copper plate. A spacer having a thickness of 1.6 mm or 0.3 mm was placed on the edge of the copper plate to create a 1.6 mm or 0.3 mm gap. Glass was then used to compress the paste to a thickness of 1.6 mm or 0.3 mm. The sample was then placed into a TCB (thermal cycling) chamber for three days and subjected to thermal cycling between −55° C. and +125° C. for 3 days.

Figure 2:
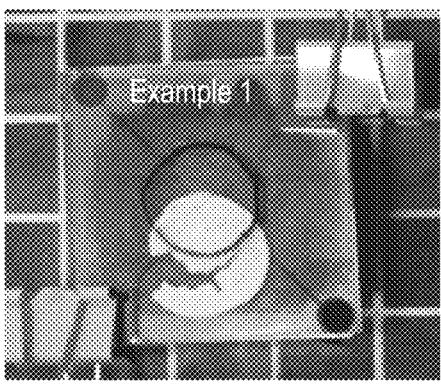
FIG. 2 is related to Example 1 and shows the samples after undergoing a thermal cycling test.
Figure 2:
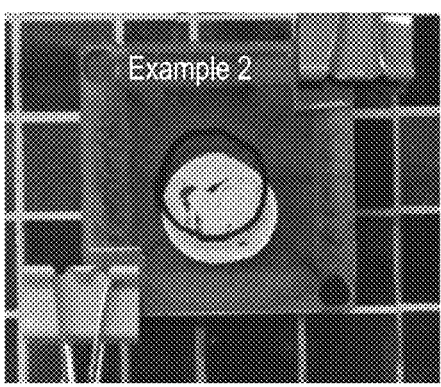
Figure 2:
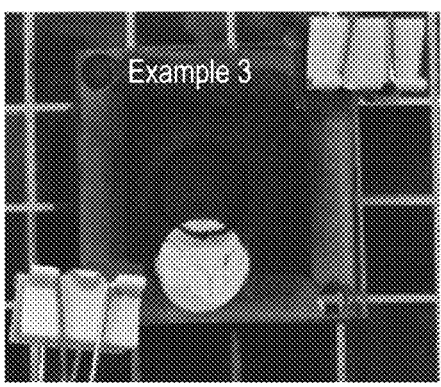
Figure 2:
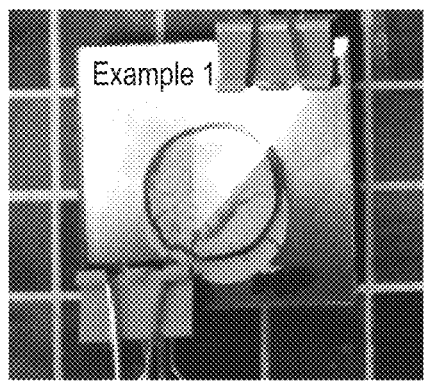
Figure 2:
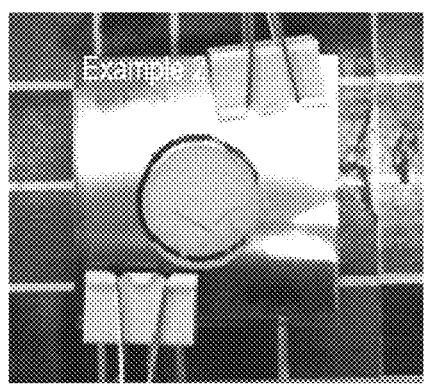
Figure 2:
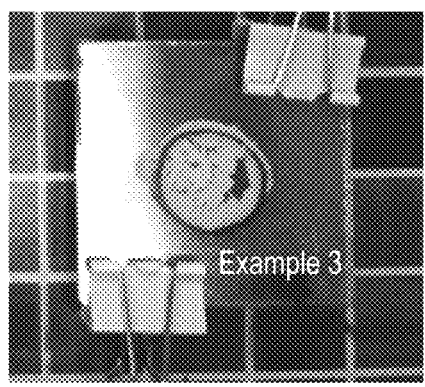

As shown in FIG. 2, in the TCB test, Example 2 exhibited a limited dripping issue while Example 3 exhibited a significant dripping issue. Further, Example 1 exhibited both cracking and dripping issues.

Example 4

Thermal gels were prepared according to the formulations shown in Table 2 and the description below.

TABLE 2

| Component | Weight (g) |
|---|---|
| Polyether polyol (bi-ol, MW: 8000 Daltons) | 7 |
| Crosslinker | 0.825 |
| Coupling agent | 0.5 |
| Antioxidant | 0.3 |
| Catalyst | 0.375 |
| Thermal conductive filler: | 45.75 |
| Thermal conductive filler | 22.875 |
| Thermal conductive filler | 22.875 |

A polyether polyol, a coupling agent, an antioxidant, and a crosslinker were weighed and added to a plastic cup. The mixture is then stirred with a speedmixer at 3000 revolutions per minute (rpm) for 30 seconds.

The thermally conductive fillers were weighed and added to the plastic cup. The mixture is stirred with a speedmixer under 2500 rpm for 3 minutes and then cooled to room temperature.

A catalyst was weighed and added to the cup. The mixture was stirred with a speedmixer under 2500 rpm for 3 minutes and then cooled to room temperature. The vacuum was then opened and the mixtures were stirred with a speedmixer at 2500 rpm for 3 minutes.

Figure 3:
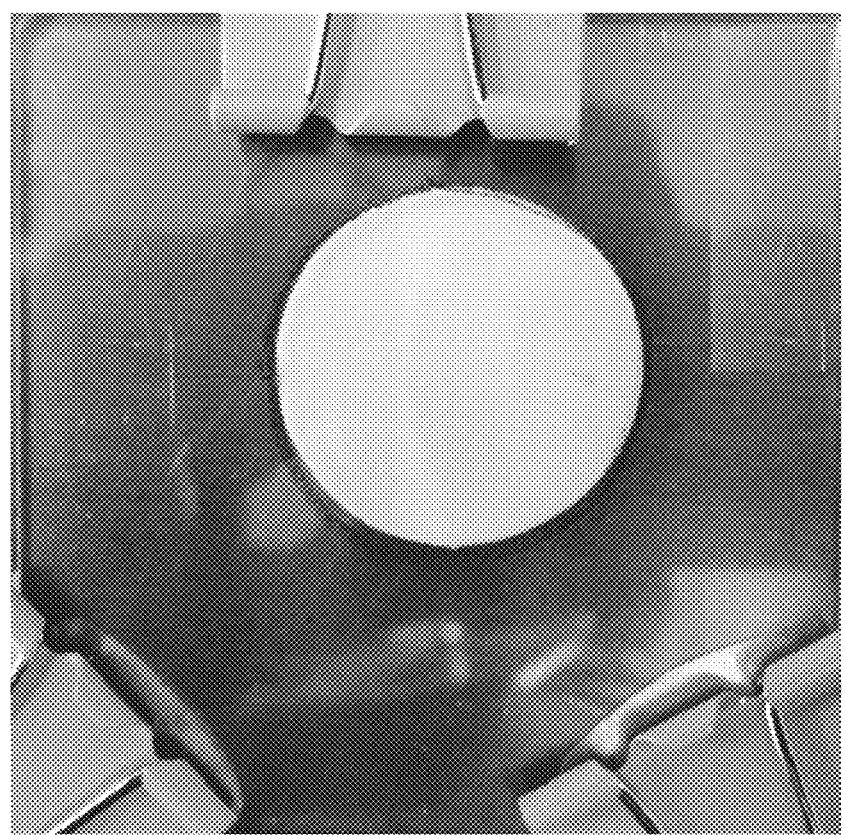
FIG. 3 is related to Example 2 and shows the sample after undergoing a baking test.
Figure 4:
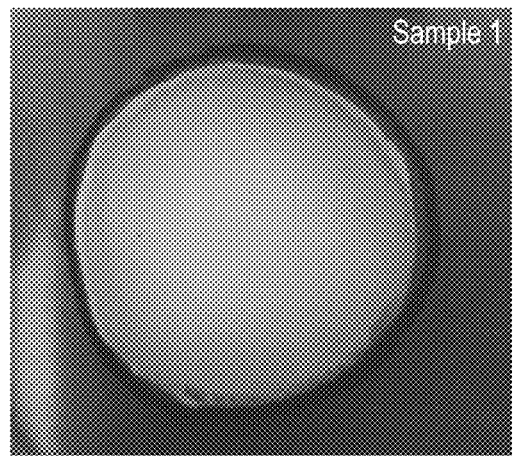
FIG. 4 is related to Example 2 and shows the samples after undergoing a thermal cycling test.
Figure 4:
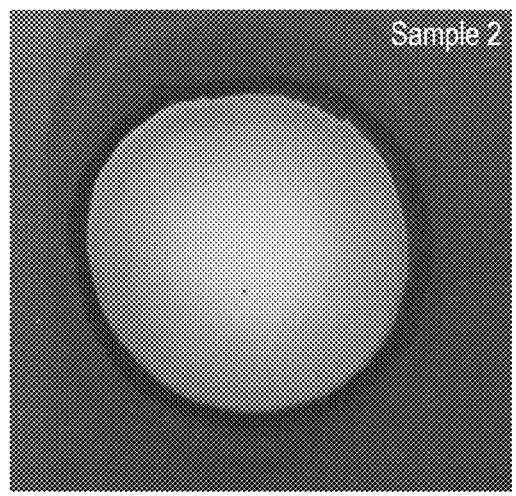
Figure 4:
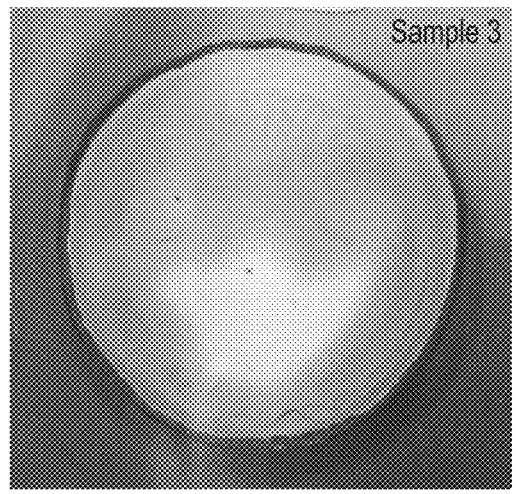

The formulations of FIGS. 3 and 4 were sandwiched between a glass and an exemplary heat sink in a vertically oriented 1.6 mm gap. Sample 3 (FIGS. 3 and 4) had the composition shown in Table 2 above with a thickness of 0.3 mm. Sample 3 was subjected to baking in an oven at 125° C. for 3 days. As shown in FIG. 3, no cracking was shown in the sample after baking for 3 days at 125° C.

Samples 1, 2, and 3 as shown in FIG. 4 have the composition listed in Table 2. Sample 1 has a thickness of 3 mm, Sample 2 has a thickness of 1.5 mm, and Sample 3 has a thickness of 0.3 mm. Both samples were subjected to TCB testing where the samples underwent thermal cycling between −40° C. and +80° C. for 3 months. As shown in FIG. 4, Samples 1 and 2 exhibited no cracking or dripping. However, the samples did exhibit a slight color change as they contained a yellow pigment.

Examples 5-7

Thermal gels were prepared according to the formulations shown in Table 3 and as described further herein.

TABLE 3

| Component | Example 5 (g) | Example 6(g) | Example 7 (g) |
|---|---|---|---|
| Polyether polyol (MW: 500-1000 Daltons, bi-ol) | — | 5.956 | — |
| Polyester polyol (MW: 500-1000 Daltons, bi-ol) | — | — | 5.956 |
| Polyether polyol (MW: ~8000 Daltons, bi-ol) | 6.932 | — | — |
| Crosslinker | 0.84 | 1.816 | 1.816 |
| Coupling agent | 0.497 | 0.497 | 0.497 |
| Antioxidant | 0.298 | 0.298 | 0.298 |
| Catalyst | 0.373 | 0.373 | 0.373 |
| Thermal conductive filler: | 45.48 | 45.48 | 45.48 |
| Thermal conductive filler | 22.74 | 22.74 | 22.74 |
| Thermal conductive filler | 22.74 | 22.74 | 22.74 |

To prepare Examples 5-7, a polyether polyol (or polyester polyol), a coupling agent, an antioxidant, and a crosslinker were weighed and added to a plastic cup to form a mixture. The mixture was then stirred with a speedmixer at 3000 revolutions per minute (rpm) for 30 seconds.

The thermally conductive fillers were then weighed and added to the plastic cup. The mixture was stirred with a speedmixer at 2500 rpm for 3 minutes after which, the mixture was cooled to room temperature.

A catalyst was then weighed and added to the cup. The mixture was stirred with a speedmixer at 2500 rpm for 3 minutes and then cooled to room temperature. The vacuum was then opened, and the mixtures were stirred with a speedmixer at 2500 rpm for 3 minutes.

Figure 5:
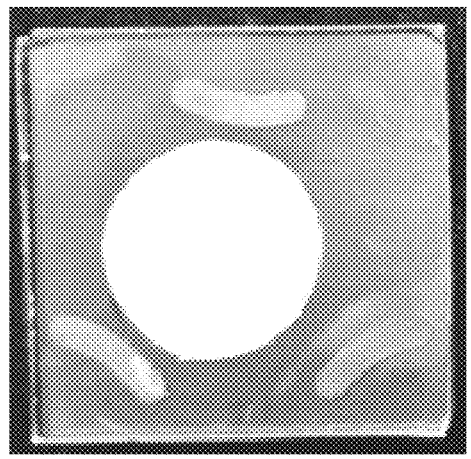
FIG. 5 is related to Examples 5-7 and shows samples after undergoing a thermal cycling test.
Figure 5:
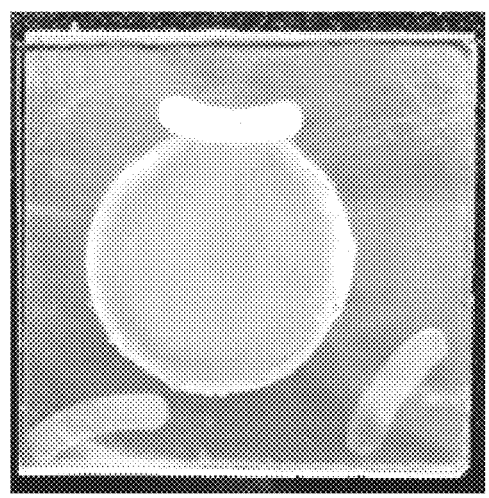
Figure 5:
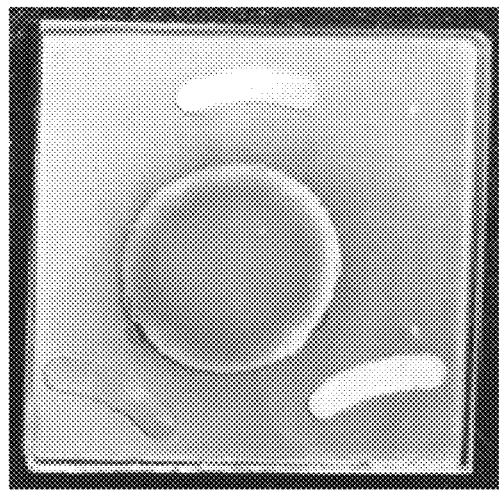

For thermal reliability testing, the three formulations were sandwiched between a glass and a copper plate in a vertically oriented 0.3 mm gap between the glass and the copper plate. The three samples were baked in an oven at 125° C. for 24 hours. As shown in FIG. 5, no cracking or dripping was exhibited by the samples during the test.

Figure 6:
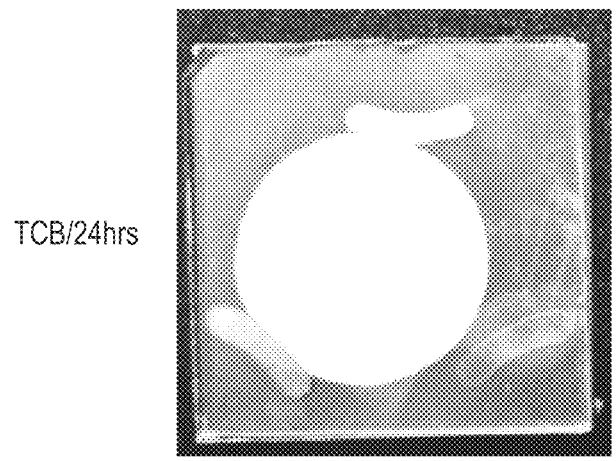
FIG. 6 is related to Examples 5-7 and shows samples after undergoing a baking test.
Figure 6:
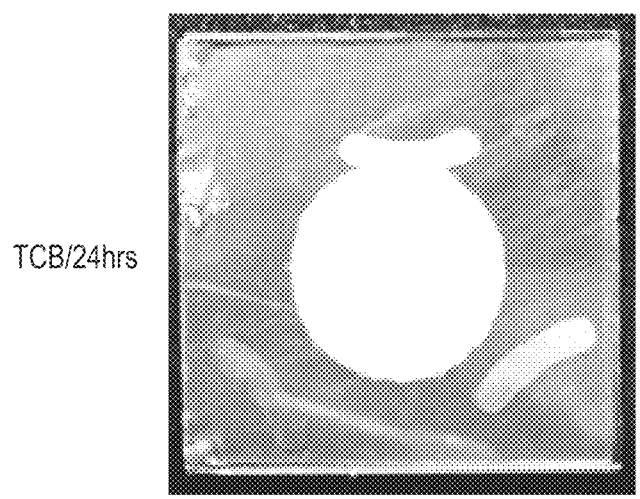
Figure 6:
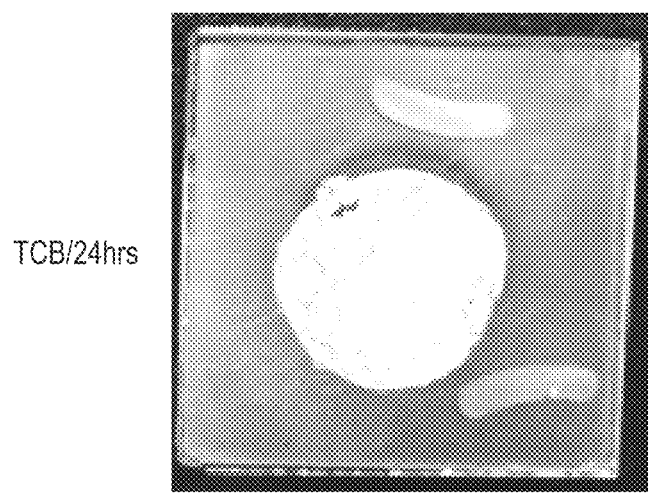

For TCB testing, the three formulations were sandwiched between a glass and an copper plate in a vertically oriented 0.3 mm gap. The samples were then subjected to TCB testing where the samples underwent thermal cycling between −40° C. and +80° C. for 24 hours. As shown in FIG. 6, Example 5 and Example 6 (polymer is polyether polyol) exhibited no cracking issues, if any; however, Example 7 (polymer is polyester polyol) exhibited serious cracking issues.

Figure 7:
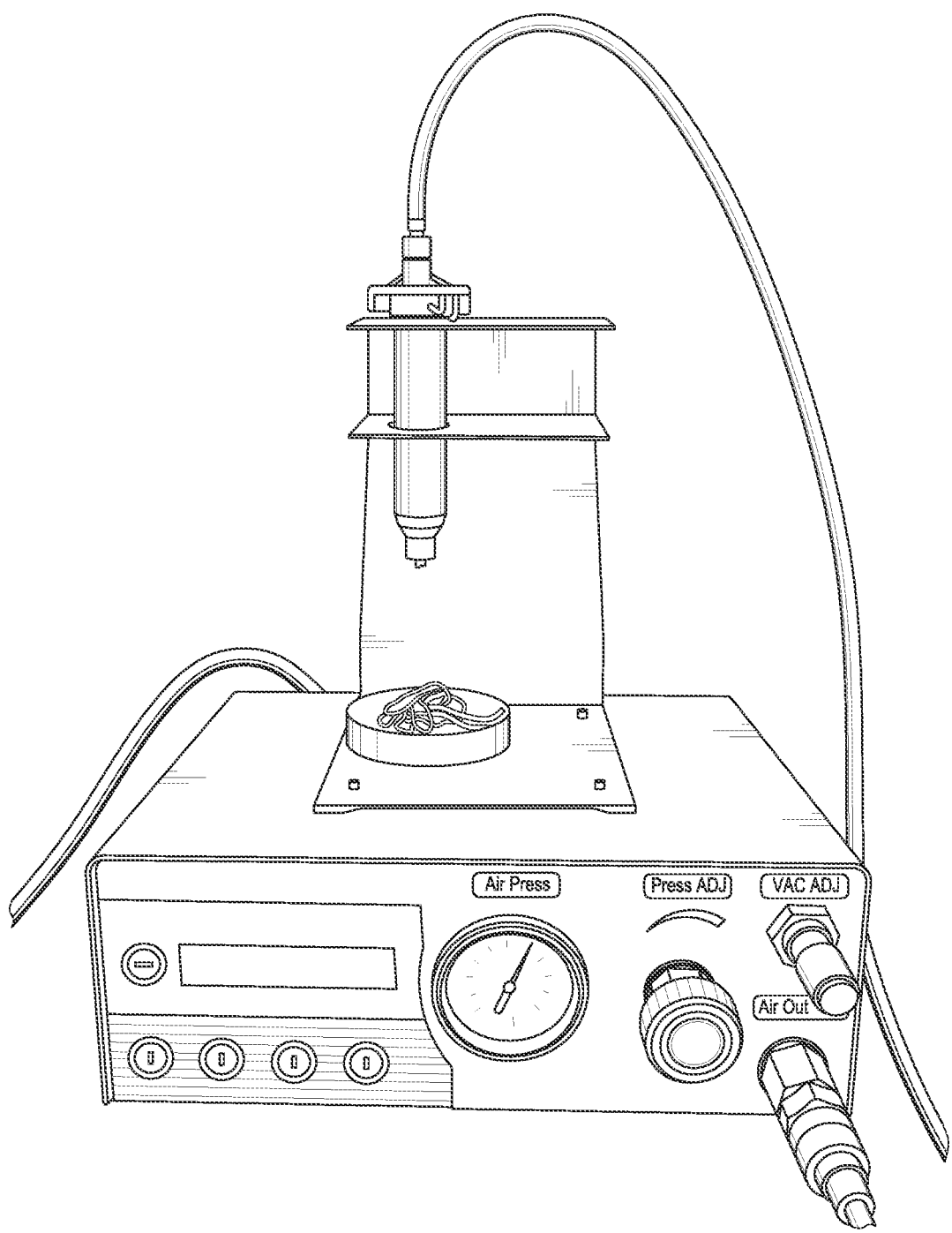
FIG. 7 illustrates a dispensing instrument used with Examples 5-7 to measure the dispense rate of the samples.

The dispense rate of Examples 5-7 were measured in the instrument as shown in FIG. 7. As shown in Table 4 below, formulations derived from polyether polyol (i.e., Example 5 and Example 6) exhibited a higher dispense rate than formulations derived from polyester polyol (i.e., Example 6).

TABLE 4

| | Dispense rate (g/min) |
|---|---|
| Example 5 | 42 |
| Example 6 | 111 |
| Example 7 | 6 |

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A thermal gel, comprising:
   a matrix including at least one polyether polyol present in an amount between 1 wt. % and 10 wt. % based on the total weight of the thermal gel, the polyether polyol including hydroxyl groups;
   a catalyst present in an amount between 0.3 wt. % and 0.6 wt. % based on the total weight of the thermal gel;
   a crosslinker including a plurality of amine groups reactive with the hydroxyl groups of the polyether polyol, the crosslinker present in an amount between 0.01 wt. % and 10 wt. % based on the total weight of the thermal gel;
   a coupling agent present in an amount between 0.1 wt. % and 5 wt. % based on the total weight of the thermal gel; and
   at least one thermally conductive filler present in an amount between 85 wt. % and 98 wt. % based on the total weight of the thermal gel.

2. The thermal gel of claim 1, further including:
   an antioxidant present in an amount between 0.2 wt. % and 0.4 wt. % based on the total weight of the thermal gel.

3. The thermal gel of claim 1, wherein the thermal gel includes silicone based components in an amount less than 1 wt. % based on the total weight of the thermal gel.

4. The thermal gel of claim 1, wherein the thermal gel has a cure temperature of below 150° C.

5. The thermal gel of claim 1, wherein the polyol is a polyether polyol, the polyether polyol is a bi-ol polymer with a molecular weight between 200 and 10000 Daltons.

6. The thermal gel of claim 5, wherein the at least one polyether polyol is present in an amount between 5 wt. % and 10 wt. % based on the total weight of the thermal gel.

7. The thermal gel of claim 1, wherein the crosslinker is an alkylated melamine formaldehyde resin.

8. The thermal gel of claim 2, wherein the catalyst includes amine neutralized benzene sulfonic acid, amine neutralized dinonylnaphthalene disulfonic acid or amine neutralized dinonylnaphthalenesulfonic acid or other type of thermal acid generator.

9. The thermal gel of claim 2, wherein the antioxidant includes at least one antioxidant selected from the group consisting of a phenol-type antioxidant, an amine-type antioxidant, or a sterically hindered, sulfur containing phenolic antioxidant.

10. The thermal gel of claim 1, wherein:
    the at least one thermally conductive filler includes a first thermally conductive filler and a second thermally conductive filler;
    the first thermally conductive filler is present in an amount between 35 wt. % and 50 wt. % based on the total weight of the thermal gel;
    the second thermally conductive filler is present in an amount between 15 wt. % and 25 wt. % based on the total weight of the thermal gel; and
    the third thermally conductive filler is present in an amount between 15 wt. % and 25 wt. % based on the total weight of the thermal gel.

* * * * *